(12) United States Patent
Price et al.

(10) Patent No.: US 10,740,090 B2
(45) Date of Patent: Aug. 11, 2020

(54) EFFICIENT APPLICATION PATCHING IN HETEROGENEOUS COMPUTING ENVIRONMENTS

(71) Applicant: Oracle International Corporation, Redwood Shores, CA (US)

(72) Inventors: David Price, Foster City, CA (US); Somanathan Muthakana, Bangalore (IN); Unnikrishnan Madhavan Nair, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 16/370,678

(22) Filed: Mar. 29, 2019

(65) Prior Publication Data

US 2019/0227786 A1 Jul. 25, 2019

Related U.S. Application Data

(63) Continuation of application No. 14/791,220, filed on Jul. 2, 2015, now Pat. No. 10,282,187.

(60) Provisional application No. 62/020,913, filed on Jul. 3, 2014.

(51) Int. Cl.
*G06F 8/65* (2018.01)

(52) U.S. Cl.
CPC ..................................... *G06F 8/65* (2013.01)

(58) Field of Classification Search
None
See application file for complete search history.

(56) References Cited

U.S. PATENT DOCUMENTS

| 6,434,744 | B1 | 8/2002 | Chamberlain et al. |
| 6,760,908 | B2 | 7/2004 | Ren |
| 7,370,092 | B2 | 5/2008 | Aderton et al. |
| 7,555,749 | B2 | 6/2009 | Wickham et al. |
| 7,853,943 | B2 | 12/2010 | McCaleb et al. |
| 8,171,547 | B2 | 5/2012 | Thorley et al. |
| 9,886,263 | B2 | 2/2018 | Banford et al. |
| 2002/0059567 | A1 | 5/2002 | Minamide et al. |
| 2004/0111719 | A1 | 6/2004 | Civlin |

(Continued)

OTHER PUBLICATIONS

AppUpdater, CodePlex Project Hosting for Open Source Software retrieved from https://appupdater.codeplex.com/ dated Oct. 2, 2015, 2006-2017, 2 pages.

(Continued)

*Primary Examiner* — Craig C Dorais
(74) *Attorney, Agent, or Firm* — Kilpatrick Townsend & Stockton LLP

(57) ABSTRACT

Techniques are disclosed for efficiently updating multiple computing systems in potentially heterogeneous computing environments. Embodiments provide for efficient patching of multiple software applications executing in multiple execution environments. For example, a custom installation tool can be provided to each of the computing devices in the cloud infrastructure system. The computing devices can execute the custom installation tool and identify, retrieve, and apply the necessary patches to applications on the computing devices. The patch-related processing across the multiple computing devices may occur in parallel such that at least a portion of the processing is performed concurrently from one another.

20 Claims, 11 Drawing Sheets

(56) References Cited

U.S. PATENT DOCUMENTS

| | | |
|---|---|---|
| 2005/0207553 A1* | 9/2005 | Fleck .................. H04Q 3/0029 379/201.12 |
| 2006/0048129 A1 | 3/2006 | Napier et al. |
| 2006/0184652 A1 | 8/2006 | Teodosiu et al. |
| 2006/0288091 A1 | 12/2006 | Oh et al. |
| 2007/0106979 A1 | 5/2007 | Felts |
| 2007/0106980 A1 | 5/2007 | Felts |
| 2007/0169082 A1 | 7/2007 | Lam et al. |
| 2007/0265094 A1 | 11/2007 | Tone et al. |
| 2007/0294668 A1 | 12/2007 | Mohindra et al. |
| 2008/0084820 A1 | 4/2008 | Aoki et al. |
| 2008/0098099 A1 | 4/2008 | Khasnis et al. |
| 2008/0130639 A1 | 6/2008 | Costa-Requena et al. |
| 2008/0163192 A1 | 7/2008 | Jha et al. |
| 2010/0031239 A1 | 2/2010 | Keromytis et al. |
| 2010/0218176 A1 | 8/2010 | Spanner et al. |
| 2011/0197175 A1 | 8/2011 | Bouz et al. |
| 2011/0225575 A1 | 9/2011 | Ningombam et al. |
| 2012/0137278 A1* | 5/2012 | Draper ..................... G06F 8/65 717/170 |
| 2012/0304172 A1 | 11/2012 | Greifeneder et al. |
| 2013/0305252 A1 | 11/2013 | Venkataraman et al. |
| 2014/0143767 A1 | 5/2014 | Nigul |
| 2014/0156742 A1 | 6/2014 | Liu et al. |
| 2015/0007262 A1 | 1/2015 | Aissi et al. |
| 2015/0089656 A1 | 3/2015 | Pappas |
| 2016/0004528 A1 | 1/2016 | Price et al. |
| 2016/0283219 A1 | 9/2016 | Banford et al. |

OTHER PUBLICATIONS

U.S. Appl. No. 14/791,220, Final Office Action dated Oct. 3, 2017, 40 pages.

U.S. Appl. No. 14/791,220, Non-Final Office Action dated Feb. 3, 2017, 23 pages.

U.S. Appl. No. 14/791,220, Non-Final Office Action dated Apr. 13, 2018, 36 pages.

U.S. Appl. No. 14/791,220, Notice of Allowance dated Dec. 28, 2018, 9 pages.

U.S. Appl. No. 15/080,384, Non-Final Office Action dated Mar. 23, 2017, 16 pages.

U.S. Appl. No. 15/080,384, Notice of Allowance dated Sep. 25, 2017, 8 pages.

U.S. Appl. No. 15/876,710, Notice of Allowance dated Jan. 22, 2020, 16 pages.

* cited by examiner

EFFICIENT APPLICATION PATCHING IN HETEROGENEOUS COMPUTING ENVIRONMENTS

CROSS-REFERENCES TO RELATED APPLICATIONS

This application is a continuation of U.S. patent application Ser. No. 14/791,220, filed Jul. 2, 2015, titled "EFFICIENT APPLICATION PATCHING IN HETEROGENEOUS COMPUTING ENVIRONMENTS," which is a non-provisional application and claims the benefit and priority of U.S. Provisional Application No. 62/020,913, filed on Jul. 3, 2014, titled "EFFICIENT APPLICATION PATCHING IN HETEROGENEOUS COMPUTING ENVIRONMENTS," the entire contents of which are incorporated herein by reference for all purposes.

BACKGROUND

Performing software patching in large-scale cloud infrastructure systems presents significant challenges compared to that faced in corporate computing environments or smaller-scale data centers. For example, compared to many traditional corporate data center installations, cloud infrastructure environments often include many different types of computing systems utilizing hardware from many different vendors. Further, these heterogeneous server computers may execute a large number of different operating systems—each requiring different patches—that further may execute many different types and/or versions of applications (e.g., web server applications, database server applications, etc.) that similarly require different patches. Moreover, the application of these different patches may need to be performed according to particular orderings. Additionally, these operating systems and/or applications may require the use of application-specific update tools. Accordingly, keeping the large numbers of applications executing across a wide variety of operating systems and server computing devices effectively patched is a slow, difficult task.

SUMMARY

The present disclosure relates to computing systems and more specifically to techniques for efficiently updating multiple computing systems in potentially heterogeneous computing environments. Certain embodiments are described that greatly reduce or eliminate the problems associated with application patching in large-scale, heterogeneous computing environments.

In certain embodiments, techniques (including systems, devices, methods, code or program instructions executed by one or more processors) are provided for efficient patching of multiple software applications executing in multiple execution (software, hardware, and/or network) environments are described. The multiple software applications may be executed by computing devices that are geographically separated, and may be located in different computing racks, data centers, rooms, buildings, offices, cities, states, and/or countries.

In certain embodiments, a custom installation tool—or "update application module"—is provided to each of the computing devices in the system. The update application module can be an application program or a piece of code that is executable on individual computing devices. In some embodiments, a top level orchestrator (e.g., an administrative server) provides the update application module to each computing device during each patching procedure. At the request of the administrative server, each computing device executes the update application module, which can occur in parallel (i.e., simultaneously) at each of one or more computing devices, or can be executed at particular times at particular computing devices according to a schedule. The update application module, in certain embodiments, identifies necessary patches, retrieves the patches, and causes the patches to be applied to the applications.

In some embodiments, the update application module uses a host-component mapping (e.g., a "property file") to determine which applications (and/or versions or releases of the applications) execute on the computing device, and thus determine which labels are applicable for the computing device. Labels are unique identifiers used to collect a grouping of patches together, and may include patches for a particular collection of one or more applications. Thus, a label associates a set of patches with a set of applications (and/or application versions). In certain embodiments, software patches for the plurality of applications are placed in a shared network location accessible to the computing devices, and are grouped according to the label. Then, the update application module gathers the required patches for that computing device according to the needed label(s) for that computing device.

In some embodiments, each update application module prepares the patches and computing environment for update, shuts down the necessary server applications, performs the patching—which may include executing application-specific update tools—and performs a post-patching process. In certain embodiments, the update application module automatically executes the previously-shut down server applications, performs configuration related steps, and allows the server applications to begin processing requests once again.

Accordingly, embodiments of the invention allow for much quicker server application patching of multiple software applications executing in potentially multiple computing (e.g., software, hardware, and/or network) environments in single or multiple geographic locations, with minimal downtime, and with minimal human interaction.

BRIEF DESCRIPTION OF THE DRAWINGS

Illustrative embodiments of the present invention are described in detail below with reference to the following drawing figures.

DETAILED DESCRIPTION OF THE INVENTION

Figure 1:
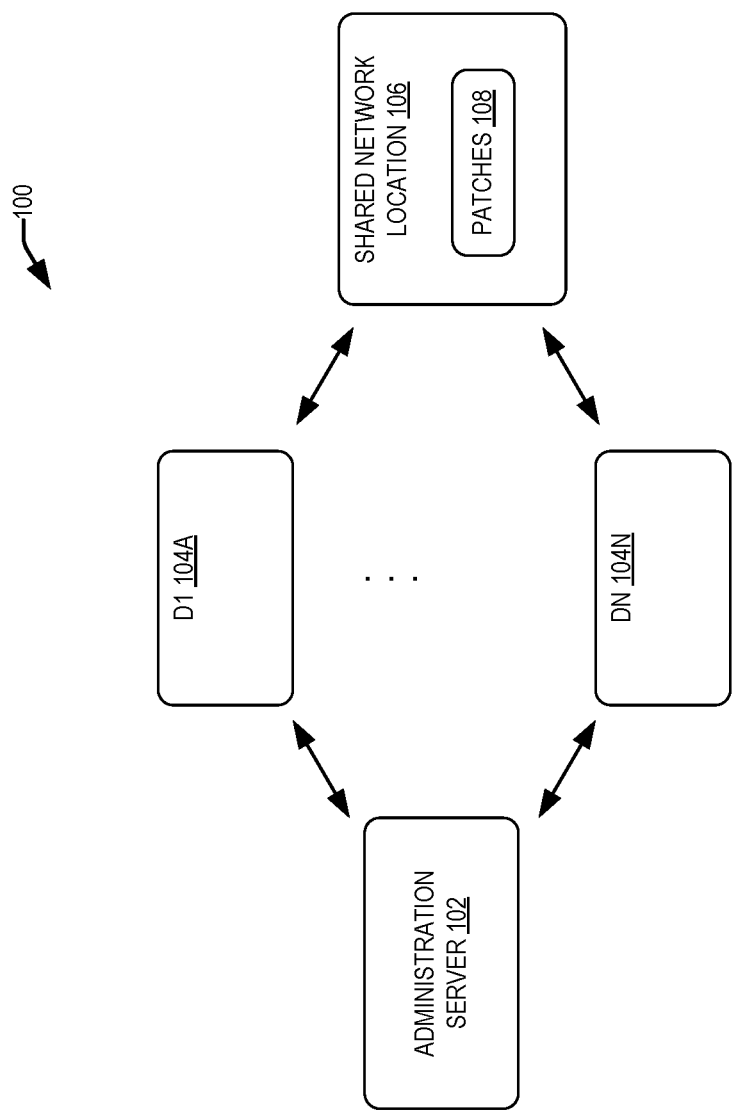
FIG. 1 depicts a simplified high level diagram of a network environment that may incorporate an embodiment of the present invention.

In the following description, for the purposes of explanation, specific details are set forth in order to provide a thorough understanding of embodiments of the invention. However, it will be apparent that various embodiments may be practiced without these specific details. The figures and description are not intended to be restrictive.

Systems depicted in some of the figures may be provided in various configurations. In some embodiments, the systems may be configured as a distributed system where one or more components of the system are distributed across one or more networks in one or more cloud infrastructure systems.

For ease understanding, the use of reference numerals ending in a letter (e.g., "M" or "N") may indicate that different numbers of that referenced element may exist in different embodiments. For example, a reference to pods 108A-108N does not indicate that there must be 14 such pods, but instead that there may be any number of pods.

As used herein, the term "patch" is used to refer to a piece of software designed to update, fix, or improve a computer program or its supporting data. A patch often modifies an application by fixing security vulnerabilities, bugs, and/or by improving the usability or performance of the application. Patches for proprietary software are typically distributed as executable files (e.g., binaries) instead of plaintext source code. This type of patch modifies the application executable either by modifying the binary file to include the fixes or by completely replacing it. Patches can also be in the form of source code modifications and thus include textual differences between two source code files (e.g., a new set of lines of code designed to replace existing lines of code). In this case, the source code files of the application are first modified according to the patches, and then the application is typically re-compiled based upon the updated source code. However, patches may also include updated data (as opposed to source code) used by the applications, and may include new data or commands (e.g., SQL commands) for a database, for example, to modify data within the database. Similarly, the term "patching" refers to a process of updating software using patches.

The term "server" as used herein typically refers to an application that executes and operates as a server according to a client-server protocol. Some examples of servers include database servers, web servers, application servers, file servers, mail servers, print servers, gaming servers, etc. In some contexts, though, the term "server" may also refer to computing hardware that can or does execute a server application. However, the particular meaning of a use of the term "server" will be apparent to those of skill in the art based upon its context of use.

Performing software patching in environments including many applications (and possibly many versions of those applications) across many computing devices is tremendously challenging. For example, patching in large-scale cloud infrastructure systems, data centers, corporate computing environments, and distributed networks can present a myriad of possible combinations of applications, operating systems, and underlying server device hardware. For example, in these types of environments there may be many different types of computing systems utilizing hardware from many different vendors. Further, these heterogeneous server computers may execute a large number of different operating systems (e.g., Windows, Unix, Linux, Macintosh OSX, etc.)—each requiring different patches—and further may execute many different types and/or versions of applications (e.g., web server applications, database server applications, etc.) that similarly require different patches. Additionally, these operating systems and/or applications may require the use of application-specific update tools, which are special-purpose applications that update particular associated applications. Accordingly, keeping the large numbers of applications executing across a wide variety of operating systems and server computing devices effectively patched is a slow, difficult task.

For example, software patching in cloud infrastructure systems is particularly challenging. A cloud infrastructure system is a collection of one or more server computing devices, network devices, and/or storage devices. These resources may be divided by cloud services providers and allotted to its customers in some manner. For example, a cloud services provider, such as Oracle Corporation of Redwood Shores, Calif., may offer various types of cloud services including but not limited to one or more services provided under Software as a Service (SaaS) category, services provided under Platform as a Service (PaaS) category, services provided under Infrastructure as a Service (IaaS) category, or other categories of services including hybrid services. Examples of SaaS services include, without limitation, capabilities to build and deliver a suite of on-demand applications such as Oracle Fusion applications. SaaS services enable customers to utilize applications executing on the cloud infrastructure system without the need for customers to purchase software for the applications. Examples of PaaS services include without limitation services that enable organizations (such as Oracle) to consolidate existing applications on a shared, common architecture, as well as the ability to build new applications that leverage the shared services provided by the platform such as Oracle Java Cloud Service (JCS), Oracle Database Cloud Service (DBCS), and others. IaaS services typically facilitate the management and control of the underlying computing resources, such as storage, networks, and other fundamental computing resources for customers utilizing services provided by the SaaS platform and the PaaS platform.

In a typical scenario, a customer can configure and send a subscription order to a cloud services provider identifying one or more services that the customer desires to order from the various services provided by the cloud services provider. The order is received by a cloud infrastructure system of the cloud services provider. The cloud infrastructure system is configured to perform processing to provide the services requested in the customer's subscription order to the customer. As part of enabling the requested services for the customer, the cloud infrastructure system is configured to allocate various resources, including compute, storage, networking, and software resources. The type of resources that are allocated and the manner in which the allocated resources are configured may be different from one service to another. For example, the resources allocated and their configuration for a Oracle Fusion Applications Service may be different from the allocation and configuration for Oracle Java Cloud Service. Further, even for the same service, the configuration may change from one customer to another based upon the customer's needs. The allocation and configuration may even change if the customer is ordering multiple services in certain combinations. Given the large volume of customers that can be serviced by the cloud services provider and the different combinations of cloud services that can be ordered by each customer, the computer systems that are allocated and configured for enabling cloud services can be quite large and heterogeneous in nature.

Once resources have been allocated and configured for a customer for a requested service, the resources have to be maintained over the life of the service. Maintenance may include updating previously allocated resources to newer versions (e.g., updating the version of a software application), adding new resources, and the like. Given the size and complexity of the resource deployments, the task of maintaining the resources is extremely complex and time consuming.

In certain embodiments, to facilitate the allocation and configuration of resources, a cloud infrastructure system may provision resources for a customer for a requested service in the form of pods, where a pod refers to a modular set of defined resources. For example, a pod may comprise a specific set of infrastructure (e.g., compute resources, network resources, and/or storage resources), middleware, and/or application resources. Pods can be designed with expandability options for compute and storage and network resources, or can be fixed based on a set compute capacity, for example.

The particular set of resources included in a pod and their configuration may be different based upon the service for which the pod is allocated. For example, a pod for a SaaS-type service may be different from a pod for a PaaS-type service, which in turn may be different from a pod for an IaaS-type service, and the like. Further, within the same cloud service type (e.g., SaaS), a pod for a first service may be different from a pod for another service. For example, in some configurations a pod may include only an application server and a database server executing on one or more server computers, but in some configurations a pod may include a complete infrastructure with identity management, load balancing, firewalls, and so on.

Some pods that are used by smaller entities (e.g., a small business) may be one-to-many, multi-tenant instances. Other pods may be dedicated one-to-one to a single entity, and some may be many-to-one. For example, a "cluster" of pods may be configured with each serving a separate division of a large entity. Moreover, pods may be tailored to the needs of a specific time zone, have specific performance or function profiles, or be tailored to specific class of customer or business. One or more pods may be geographically located at a same location (e.g., at a data center), while one or more pods may be deployed to a customer premise, and can optionally be managed remotely.

FIG. 1 depicts a simplified high level diagram of a network environment 100 that may incorporate an embodiment of the present invention. As shown, network environment 100 comprises multiple computing devices 104A-104N, administrative server 102, and shared network location 106. The embodiment depicted in FIG. 1 is merely an example and is not intended to unduly limit the claimed embodiments of the present invention. One of ordinary skill in the art would recognize many variations, alternatives, and modifications. For example, there may be more or less computing devices than those shown in FIG. 1.

Computing devices 104A-104N may be of various different types, including, but not limited to sever computers executing a large number of different operating systems. Some examples of server computers include database servers, web servers, application servers, file servers, mail servers, print servers, gaming servers, etc. In some embodiments, one or more computing devices 104A-104N may execute one or more applications, including but not limited to database servers, web servers, application servers, etc. In some embodiments, a computing devices may execute one or more application-specific update modules, which are applications (or portions thereof) that are tasked with updating (i.e., patching) a particular application or set of applications.

Administrative server 102 can be a top level orchestrator or other cloud management utility that provides the update application modules to the various computing devices during each patching procedure. In some embodiments, administrative server 102 may execute on a separate computing device external to computing devices 104A-104N, execute on a client device (e.g., of a network administrator), or execute on a computing device within a pod.

Shared network location 106 can be a network-mappable "shared" drive/folder of a file server or other server, which may be in a private network accessible to at least some of the computing devices or across a public network (e.g., the Internet). In some embodiments, the software patches for application programs or components may be placed in a shared network location 106 accessible to the computing devices. In certain embodiments, shared network location 106 can only be accessed via a read-only process to minimize slowing down the retrieval process (e.g., from any writes).

To efficiently patch multiple software applications executing in multiple computing devices, computing devices 104A-104N may receive an update application module from administrative server 102. In some embodiments, an update application module may be provided by administrative server 102 to each computing device in order for the computing devices to perform a patching procedure. In certain embodiments, each computing device 104A-104N may receive a same copy of the update application module to be executed individually on their respective devices.

After receiving the update application module, each computing device can execute the update application module. In some embodiments, the execution of the update application module may be executed at the request of administrative server 102. The execution of the update application modules across the various computing devices 104A-104N can be executed independently from each other. Part or all of the processing across the various computing devices 104A-104N can be done in parallel or concurrently. In some instances, the update application modules can be executed at particular times at particular computing devices according to a schedule or in an order designated by administrative server 102.

In some embodiments, the update application module being executed on each of computing devices 104A-104N can determine the applications and/or versions or releases of the applications that are currently running on each of the computing devices (also referred to as configuration information throughout this disclosure). In some embodiments, the configuration information can be determined by performing a scan of an operating system to search for particular application files or by searching through currently executing processes (e.g., issuing a "ps" Unix/Linux command to display executing processes), etc. In certain embodiments, the update application module uses a property file (e.g., received from an administrative server) to determine the configuration information of a computing device.

Based on the configuration information for a computing device, the update application module being executed on that computing device may determine which labels or software patches may be applicable for the computing device. Labels are unique identifiers used to collect a grouping of patches together, and may include patches for a particular collection of one or more applications. Thus, a label associates a set of patches with a set of applications (and/or application versions). In certain embodiments, software patches for the plurality of applications are placed in a shared network location accessible to the computing devices, and are grouped according to the label. Then, the update application module gathers the required patches for that computing device according to the needed label(s) for that computing device.

Subsequent to determining the software patches applicable for computing devices 104A-104N, an update application module being executed on each of computing devices 104A-104N may retrieve the required patches 108 for that computing device from shared network location 106. Upon receiving the patches for a computing device, the update application module may prepare the patches and the computing environment for update. In some embodiments, the update application module may shut down the necessary server applications and perform the patching. In certain embodiments, upon retrieving a set of patches that are applicable for components on a computing system, an update application module may determine an execution flow that determines the order in which the individual patches are applied. In some embodiments, the execution flow may be determined based on dependencies among components and apply the patches according to the execution flow.

After the patching is performed, the update application module may perform a post-patching process where the update application module automatically executes the previously shut down server applications, performs configuration related steps, and allows the server applications to begin processing requests once again.

As shown in this example, each computing system 104A-104N on which the patches are to be applied itself determines the required patches for the computing system. This is facilitated by the update application module that is distributed to each of computing systems 104A-104N. An update application module running on each computing system 104A-104N performs a determination as to the patches required for each system, thereby allowing the systems to be updated in parallel.

Furthermore, by not requiring a central server to perform the determination of the required patches for each computing system, each computing system may perform its update without affecting one another. Thus, if one updating system for a computing system is down, the others may not be affected by the failure and continue their updates. This decentralized updating system ensures that there is no bottleneck at a potential central server.

Network traffic may also be reduced as the required patches for each computing system can be determined locally by an update application module running at each computing system. The required patches need not be determined by a central server or similar network entity that would require a large amount of network communication between the central server and the various devices in order to perform updates.

Figure 2:
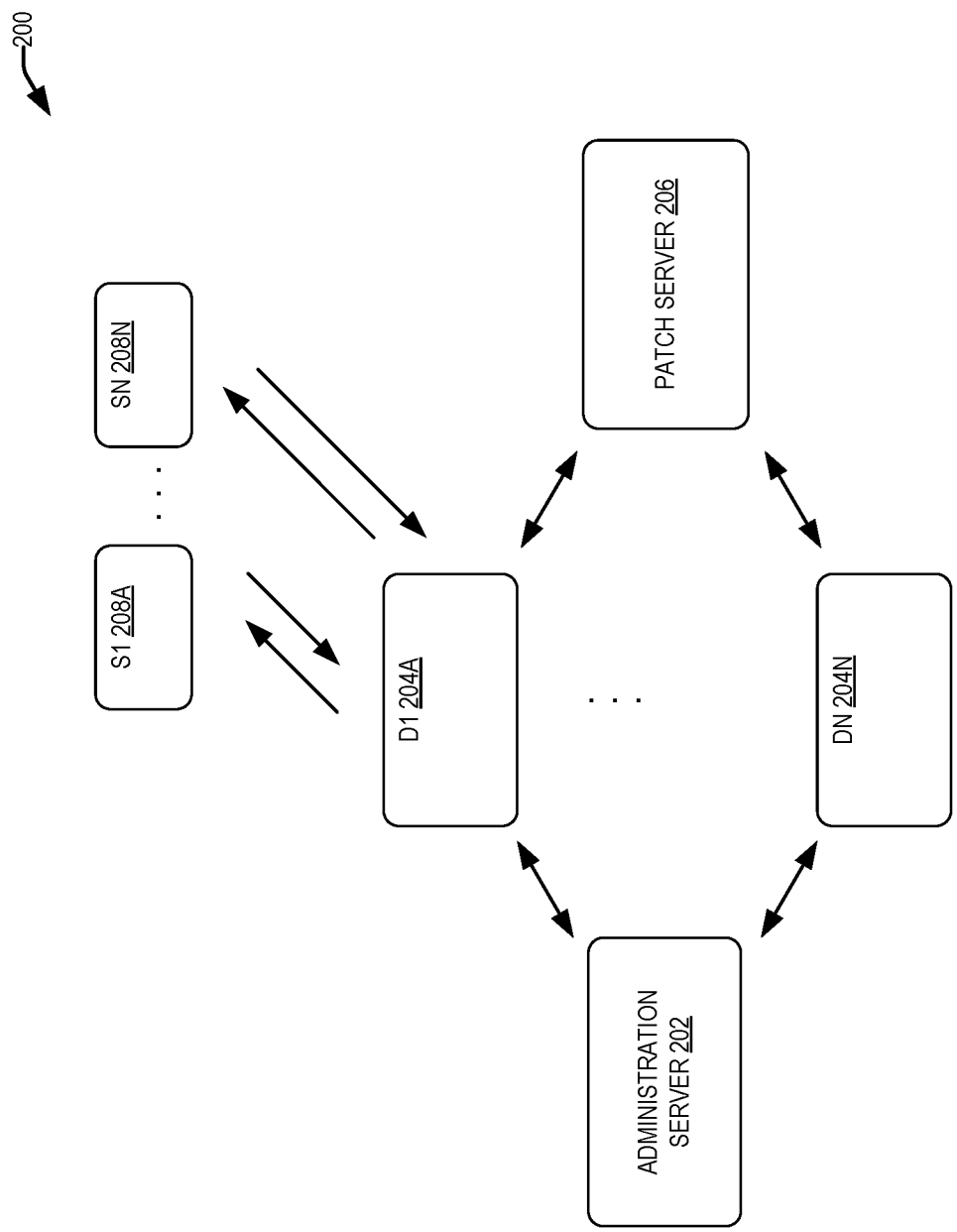
FIG. 2 depicts a simplified high level diagram of another network environment that may incorporate an embodiment of the present invention.

FIG. 2 depicts a simplified high level diagram of another network environment 200 that may incorporate an embodiment of the present invention. As shown, network environment 200 comprises multiple computing devices 204A-204N, an administrative server 202, a patch server 206, and multiple servers 208A-208N. The multiple computing devices 204A-204N may be similar to the multiple computing devices 104A-104N described in FIG. 1. Similar to in FIG. 1, in certain embodiments, one or more computing devices 204A-204N may be part of a pod that has been sanctioned for a cloud service for a customer. One or more of devices 204A-204N may be reconfigured to provide a service to a customer. Administrative server 202 may also be similar to administrative server 102 described in FIG. 1.

Similar to that described above in FIG. 1, the multiple computing devices can each receive an update application module from administrative server 202. Upon receiving a request from administrative server 202 to execute the update application module, one or more of computing devices 204A-204N can begin executing the update application module. The execution of the update application modules on the various computing devices can occur independently from each other where each update application module of each computing device is executed on its individual computing device without interference or without being affected by the execution of an update application module on another computing device. The execution of the update application modules on the various computing devices may occur concurrently with each other where a portion or all of the patch update processing can be done concurrently or in parallel among the various computing devices. The update application module being executed on each device can identify the necessary patches for the computing device.

In some embodiments, the update application module being executed on each of computing devices 204A-204N can determine the configuration information of each device. The configuration information can include the applications and/or versions or releases of the applications that are currently running on each of the computing devices. In some embodiments, the configuration information can be determined by performing a scan of an operating system to search for particular application files or by searching through currently executing processes (e.g., issuing a "ps" Unix/Linux command to display executing processes), etc. In some embodiments, the configuration information may be stored in a property file received from administrative server 202. The property file may identify applications (and/or versions or releases of the applications) that are executing upon a computing device.

Based on the configuration information for a computing device, the update application module being executed on that computing device may determine which labels or software patches may be applicable for the computing device. In some embodiments, these software patches may be grouped according to the label. As described, labels are unique identifiers used to collect a grouping of patches together, and may include patches for a particular collection of one or more applications. A label may associate a set of patches with a set of applications (and/or application versions).

In certain embodiments, the update application module may determine the required labels or patches for its applications by communicating with a patch server 206. The update application modules of computing devices 204A-204N can send configuration information to patch server 206. In return, patch server 206 may send back to the respective computing devices patch identification information identifying the required labels or patches for each computing device and/or one or more server locations in which the required labels or patches may be accessible.

In certain embodiments, different software patches for applications may be accessible to the computing devices at different server locations (such as servers 208A-208N). The update application module may gather the required patches for a computing device from servers 208A-208N according to the patch identification information received from patch server 206. Servers 208A-208N can include database servers, web servers, application servers, file servers, mail servers, print servers, gaming servers, etc. Servers 208A-208N may be in a private network accessible to at least some of the computing devices or across a public network (e.g., the Internet).

According to the patch identification information received from patch server 206, a computing device can request a subset of patches from one or more servers 208A-208N. In some embodiments, patch identification information may indicate a location where certain required label(s) or patch(es) are stored or are accessible. Different subsets of the required patches may be accessible at different server locations 208A-208N. Thus, the update application module at a single computing device may request different subsets of patches from different servers 208A-208N. In some embodiments, the update application module gathers the required patches for that computing device according to the needed label(s) for that computing device.

The update application module may then install the subsets of patches on the computing device. Upon receiving each subset of patches from a server, the update application module prepares the subset of patches and the computing environment for update. The update application module shuts down the necessary server applications and performs the patching. Subsequently, the update application module performs a post-patching process. If any additional subsets of patches are received from another server, the update application module may prepare that subset of patches for update.

Figure 3:
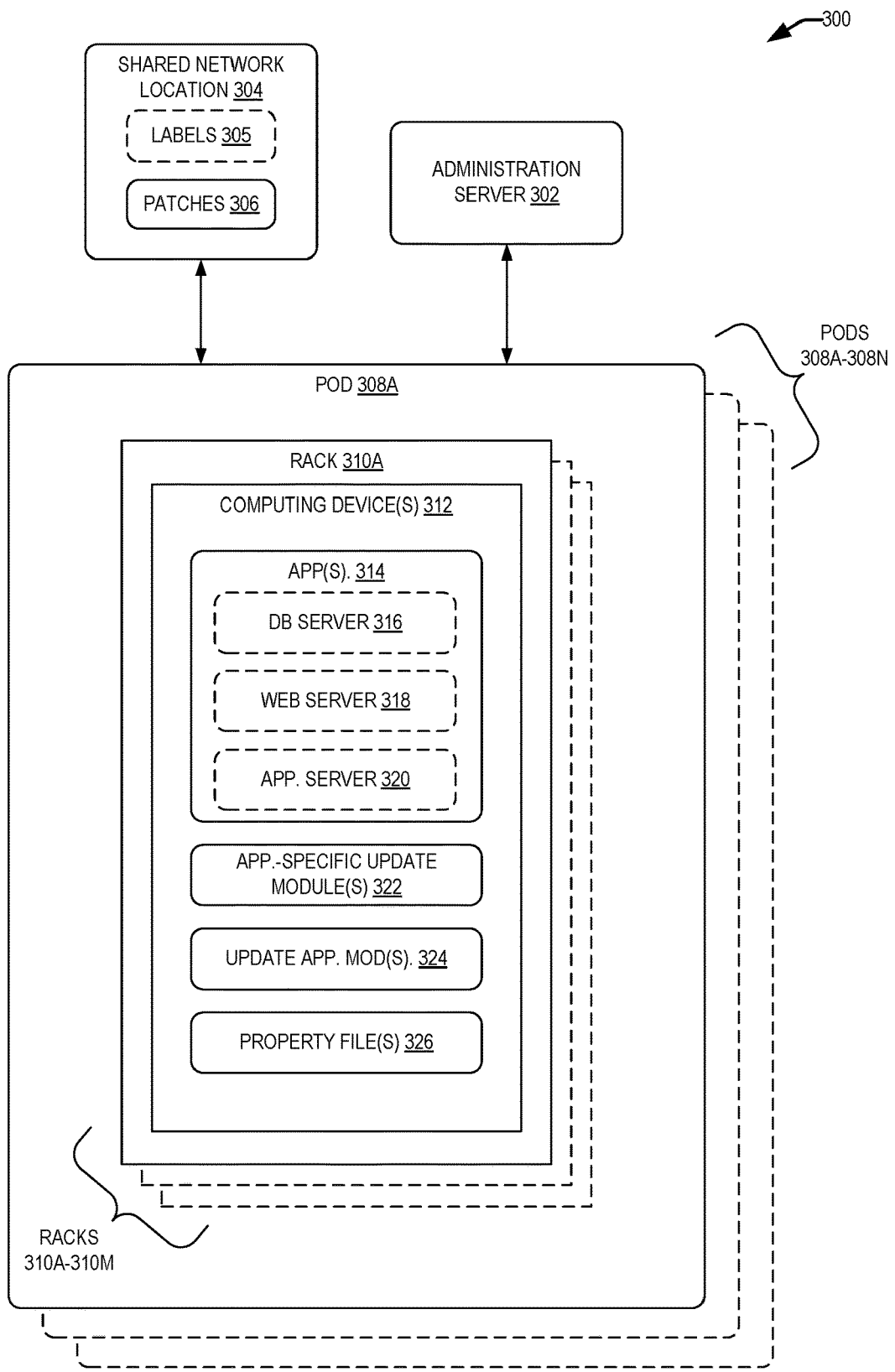
FIG. 3 illustrates a system including computing devices of one or more pods utilizing update application modules in accordance with an embodiment of the present invention.

FIG. 3 illustrates a system 300 including computing devices of one or more pods utilizing update application modules in accordance with an embodiment of the present invention. Although this discussion may be framed in the context of cloud infrastructure systems, embodiments of the invention are useful in any computing environment having applications requiring patching, and are especially useful in computing environments having multiple computing devices executing multiple applications requiring patching. Thus embodiments are useful for home (i.e., individual-owned) computing systems, small entity computing systems (e.g., a small office), large entity computing systems (e.g., a corporate network), data centers, cloud infrastructure systems, and other computing system environments.

As shown in FIG. 3 and described above, computing devices in a cloud infrastructure system may be configured in pods (e.g., pod 308A). In this depicted embodiment, a pod may include one or more computing devices 312 that may be mounted in a rack 310A, and further may include more than one such rack (e.g., racks 310A-310M) and may also include networking hardware (e.g., switches, hubs, routers, etc., which are not illustrated herein for the sake of clarity).

For example, in some embodiments a pod 308A comprises nine computing devices 312 and one or more networking devices including Top-of-Rack (ToR) switch; and in some embodiments, the pods 308A-308N are connected together using network aggregation devices. The one or more computing devices 312, in various embodiments, execute one or more applications 314, including but not limited to database servers 316, web servers 318, application servers 320, etc. As another example, in an embodiment the one or more applications 314 executing within a pod do not include a database server 316, but instead access an extra-pod set of one or more computing devices executing one or more database servers (e.g., using Open Database Connectivity (ODBC), Call Level Interface (CLI), Java Database Connection (JDBC), Oracle Call Interface (OCI), or even direct connections to a "remote" database server). In some embodiments, the computing devices 312 may also execute one or more application-specific update modules 312, which are applications (or portions thereof) that are tasked with updating (i.e., patching) a particular application or set of applications.

In environments such as that depicted in FIG. 3, which includes one or more pods 308A-308N (e.g., 10s, 100s, 1000s, or more), each potentially including one or more racks 310A-310M that each include one or more potentially different computing devices 312, it is tremendously difficult to keep all of the applications 314 up to date with latest bug fixes, security updates, and new version releases. This is particularly true as many updates to these applications require many manual (i.e., requiring human input) steps that need to be performed before (i.e., during a "pre-downtime" phase 602), during (i.e., during an "installation" phase 614), and/or after (i.e., during a "post-installation" phase 642) the patch or patches are applied. Moreover, there may be hundreds (or more) of different software applications and versions requiring updating, which may require particular patch ordering due to dependency issues. As an example of a dependency issue, a first application may need to be patched before a second application in order for the second application to be properly patched. Some embodiments may determine the patch ordering based on dependencies among components and apply the patches according to the determined patch ordering.

Embodiments of the invention address these and other issues individually and/or collectively. According to an embodiment, patches are gathered and processed (using automated and/or manual processes) for one or more of the applications 314 used in the cloud infrastructure system. Each patch will be associated with (i.e., designed for) a particular application or set of versions of an application or even set of applications. Thus, during this processing each patch may be associated with one or more labels. A label is an indicator of a particular application or set of applications, and may identify a particular version/release of a particular application, just a particular application with no reference to a version/release, or a set of applications. For example, a patch may be applied to versions 4, 5, and 6 of APP1 as well as all versions of APP2. Thus, the patch may be associated with one label (e.g., "APP1_4_5_6 APP2"), two labels (e.g., "APP1_4_5_6" and "APP2"), or more labels (e.g., "APP1_4", "APP1_5", "APP1_6", "APP2", etc.). A label may be associated with zero patches, 1 patch, or more than one patch—e.g., 100s of patches. These patches 306 (and optionally, a mapping 305 of which patches are associated with which labels) may be placed at a shared network location 304. In some embodiments, shared network location 304 is a network-mappable "shared" drive/folder of a file server or other server, which may be in a private network accessible to at least some of the computing devices 312 or across a public network (e.g., the Internet).

In some embodiments, an administrative server 302 (such as a top-level orchestrator or other cloud management utility), which may manage the pods 308A-308N by executing the applications 314 and configuring the computing devices 312 for various entities, may send one or more property files 326 to one or more of the computing devices 312. For example, in an embodiment, the administrative server 302 transmits, to each of the computing devices 312 that are to be updated, one property file. The property file may represent a host-component mapping indicating which applications 314 are executing upon that particular recipient host, and thus the property file may be custom to each particular computing device 312. However, in some embodiments the property file includes a host-component mapping for multiple computing devices 312, and thus a same property file may be transmitted to each of the computing devices 312. The administrative server 302 may execute on a separate computing device external to any existing pods 308A-308N, execute on a client device (e.g., of a network administrator), or execute on a computing device within a pod.

According to some embodiments, the administrative server 302 transmits a copy of an update application module 324 to one or more (or all) of the computing devices 312 to be updated. In some embodiments, this transmission occurs during each patching procedure, but in other embodiments this transmission may occur only once before a first patching procedure, and subsequent patching procedures may continue to utilize a same update application module 324. The update application module 324 may be a standalone executable application, a portion of an application, a configuration file to be used with another update application, etc. In some embodiments, the update application module 324 includes the property file 326. In some embodiments, upon request of either the administrative server 302 or the computing devices 312, the version of the update application module 324 will be checked to determine if it is the latest version, and if not, the administrative server 302 will then transmit it to all necessary computing devices 312.

At some point, an update application module 324 of one of the computing devices 312 will execute. This execution may be triggered by the administrative server 302 issuing a command to that computing device 312, triggered by a schedule (e.g., a "cronjob"), triggered by a user manually issuing a command, etc. In some embodiments, the administrative server 302 issues a command to more than of the computing devices 312 at a time, thus enabling those update application modules 324 to execute in parallel (i.e., simultaneously).

Upon execution, the update application module 324 may utilize the property file 326 to determine which software components (e.g., applications 314) are executing upon that computing device 312. In other embodiments, the update application module 324 instead determines all relevant software components dynamically without the use of a property file 326, such as by querying an operating system to search for particular application files, searching through currently executing processes (e.g., issuing a "ps" Unix/Linux command to display executing processes), etc.

With knowledge of the set of executing and relevant applications 314 on that device, the update application module 324, in some embodiments, connects to the shared network location 304 and may query the mapping of labels 305 (e.g., download and examine, or issue an API call to the device at the shared network location 104) to determine one or more labels that are applicable. Thus, the update application module 324 is able to retrieve a set of patches 306 that the particular computing device requires (with respect to the executing applications).

With the necessary patches, the update application module 324 may first enter a pre-patch phase (i.e., pre-downtime phase 602), which may be entered in response to receipt of a command from the administrative server 302. This stage may include "unpacking" the patches (e.g., extracting/unzipping/deflating). The update application module 324, in this stage, may also place the extracted patches into one or more directories. In an embodiment, the update application module 324 places the patches into a hierarchy of one or more levels of directories that are based upon the labels that the patches are associated with. For example, within a "work" directory (e.g., "/update"), the update application module 324 may create a directory for each label, and place the patches associated with that label inside its directory.

Upon a conclusion of the pre-downtime phase 602, the update application module 324 may (optionally in response to receipt of a command from the administrative server 302) shut down all applications (e.g., servers) that are to be updated. This "shut down" may include terminating the executing process(es) of the application and/or issuing a command to those process(es) causing them to stop actively serving requests.

At this point, the update application module 324 (again, optionally in response to receipt of a command from the administrative server 302), will begin an "installation" phase 614 where it causes the patches to be applied (e.g., executed). In some embodiments, the update application module 324 may directly perform the application of the patches, and in some embodiments the update application module 324 works together with another one or more applications (e.g., application-specific update modules 322) to apply the patches. In some embodiments, during one "installation" phase 614 the update application module 324 both directly performs the application of some patches and also works with (e.g., issues commands to, or executes) one or more application-specific update modules 322 for other patches.

In some embodiments, the update application module 324 then performs a post-patch process (i.e., a post-installation phase 642) comprising one or more of making domain configuration changes, executing database scripts, modifying filesystem properties/permissions, etc. At this point, the update application module 324 may bring the applications 312 back online, e.g., executing the applications 314 or sending instructions to the applications 314 to enter an "online" mode. In some embodiments, the update application module 324 performs further configuration steps that need to occur while the applications are executing, and then "releases" these applications 652 back for use—i.e., allow the applications to continue normal processing.

Figure 4:
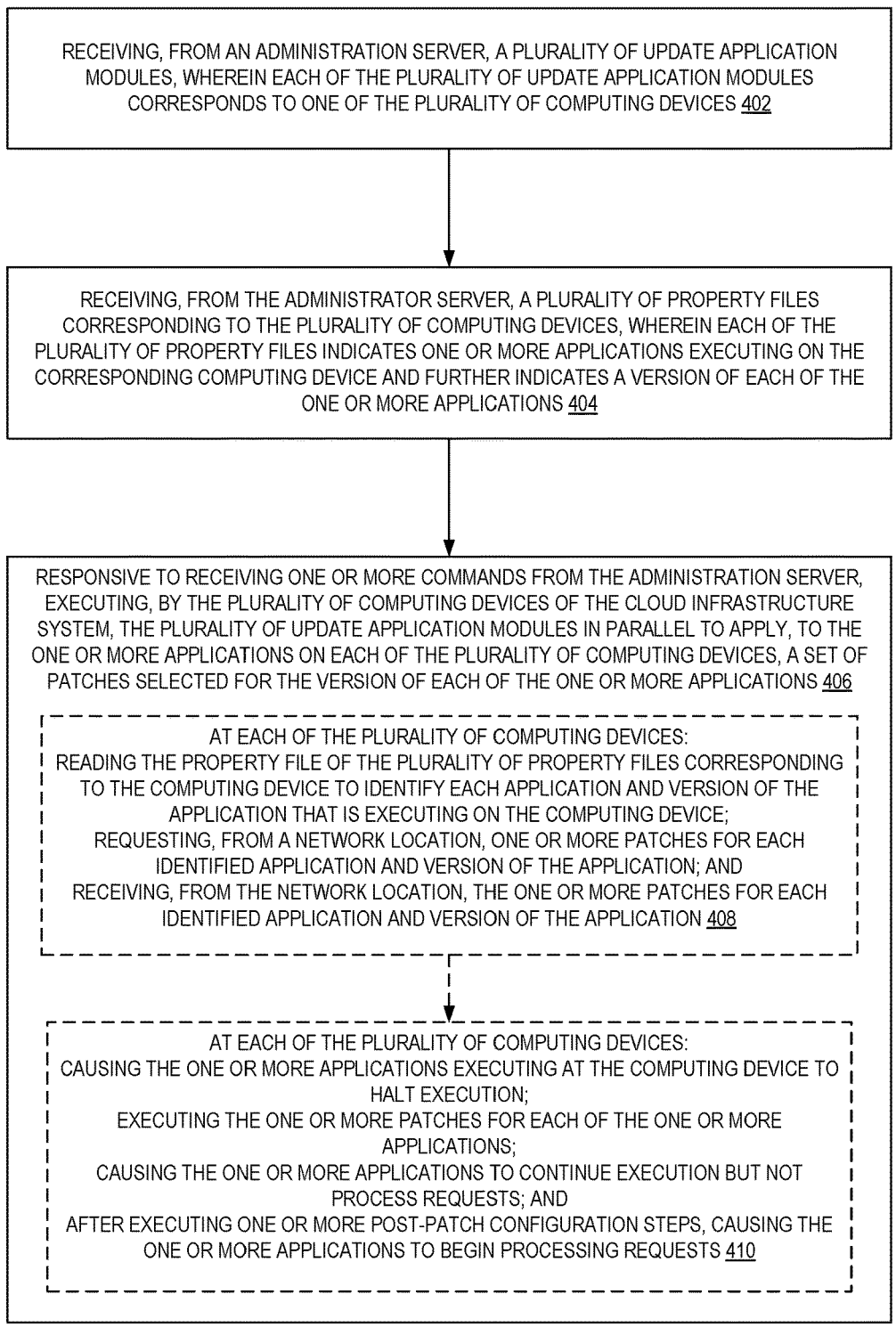
FIG. 4 illustrates a flow in a cloud infrastructure system comprising a plurality of computing devices executing a plurality of server applications for efficient application patching in accordance with an embodiment of the present invention.

FIG. 4 illustrates a flow 400 in a cloud infrastructure system comprising a plurality of computing devices executing a plurality of server applications for efficient application patching in accordance with an embodiment of the present invention. In some embodiments, the flow 400 is performed by two or more of the plurality of computing devices in the cloud infrastructure system, and in some embodiments this flow 400 may be performed in parallel by these computing devices.

In the depicted embodiment, flow 400 begins with block 402, where the computing device receives, from an administrative server, a plurality of update application modules. In some embodiments, each of the plurality of update application modules corresponds to one of the plurality of computing devices 402. In some embodiments, each update application module is the same, but in some embodiments each is customized to the particular computing device (e.g., based upon the operating system and/or resources of the computing device, or based upon the particular applications executing on that computing device).

At block 404, in an embodiment, flow 400 further includes receiving, from the administrative server 302, a plurality of property files corresponding to the plurality of computing devices. Each of the plurality of property files indicates one or more applications executing on the corresponding computing device, and may further indicate a version of each of the one or more applications.

At block 406, responsive to receiving one or more commands from the administrative server, flow 400 includes executing, by the plurality of computing devices of the cloud infrastructure system, the plurality of update application modules (perhaps in parallel) to apply, to the one or more applications on each of the plurality of computing devices, a set of patches selected for the version of each of the one or more applications. In some embodiments, this includes performing 408 a first set of operations at each of the plurality of computing devices. The first set of operations includes reading the property file of the plurality of property files corresponding to the computing device to identify each application and version of the application that is executing on the computing device. The first set of operations also includes requesting, from a network location, one or more patches for each identified application and version of the application, and also includes receiving, from the network location, the one or more patches for each identified application and version of the application.

In some embodiments, block 406 includes, at each of the plurality of computing devices, performing a second set of operations. The second set of operations includes causing the one or more applications executing at the computing device to halt execution, executing the one or more patches for each of the one or more applications, causing the one or more applications to continue execution but not process requests, and, after executing one or more post-patch configuration steps, causing the one or more applications to begin processing requests.

Figure 5:
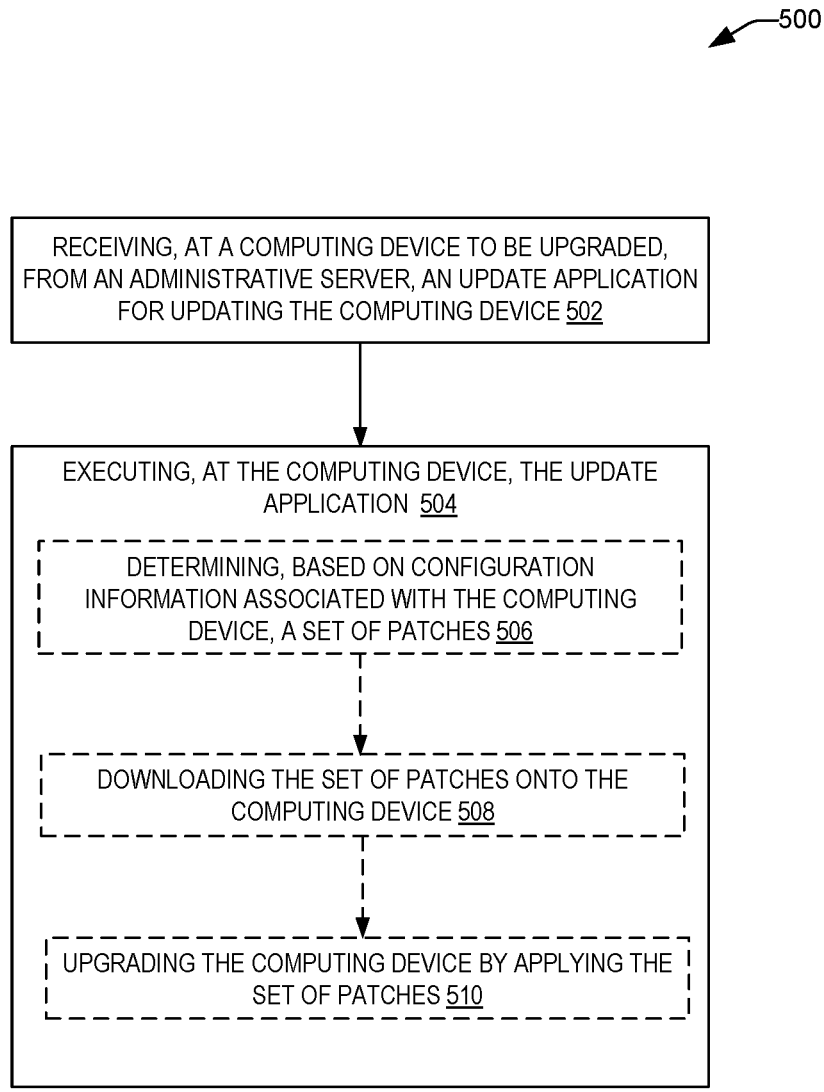
FIG. 5 illustrates an example flow from the perspective of a computing device for upgrading the computing device in accordance with certain embodiments of the present invention.

FIG. 5 illustrates an example flow 500 from the perspective of a computing device for upgrading the computing device in accordance with certain embodiments of the present invention. This flow, in some embodiments, is performed by one computing device that is potentially in a set of multiple computing devices being patched in the cloud infrastructure system. The multiple computing devices may perform their individual update processing independently but in parallel where at least a portion of the processing is performed concurrently among the different computing devices.

In the depicted embodiment, flow 500 begins with block 502, where the computing device to be upgraded receives, from an adminstrative server, an update application for updating the computing device. In some embodiments, a top level orchestrator (e.g., an adminstrative server) provides the update application module to each computing device as part of a patching procedure. The administrative server can send out an update application module to each of the multiple computing devices simultaneously or sequentially to enable the multiple computing devices to perform a patching procedure on their individual devices. The update application module allows each computing device to identify the necessary patches for the computing device, retrieve the patches, and cause the patches to be applied to the applications being executed on the computing device.

A block 504, flow 500 can execute the update application module at the first computing device. In some embodiments, the updated application module is executed upon receiving a request from the administrative server. In certain embodiments, the update application module may be executed according to a schedule. The schedule may designate certain times (e.g., either one or more times or periodically) at which to execute the update application module. Different computing devices may execute their update applications at different times. The execution of the application applications across multiple computing devices may occur in parallel where at least a portion of the processing is performed concurrently.

At block 506, flow 500 can determine, based on configuration information associated with the first computing device, a set of patches. In some embodiments, the configuration information associated with a computing device can identify the applications (and/or versions or releases of the applications) that are executing upon the computing device. In certain embodiments, the configuration information may be stored in a property file. The property file may be received from a top-level orchestrator or other cloud management entity such as the administrative server. Based on the configuration information, an update application module being executed on the computing device can determine the set of patches that are necessary to update the applications (and/or versions or releases of the applications) that are executing upon the computing device.

In some embodiments, the update application module may determine the set of patches by sending the configuration information to a patch server. Upon receiving the configuration information of a computing device, the patch server may then determine the necessary patches for an update and send back patch identification information to the computing device. The patch identification information may include identifiers for the set of patches and/or network locations at which each of the set of patches may be retrievable.

At block 508, flow 500 can download the set of patches onto the first computing device. In some embodiments, the update application may request one or more patches for each application (and/or versions or releases of the applications) identified by the configuration information from a network location. The network location may be a shared network location that stores all the patches. In certain embodiments, the update application may retrieve subsets of patches from different servers.

At block 510, flow 500 can upgrade the first computing device by applying the set of patches. The update application can apply the set of patches selected for the version of each of the one or more applications. In some embodiments, the set of patches may be applied by causing the one or more applications executing at the computing device to halt execution. The update application may execute the one or more patches for each of the one or more applications. The update application may then cause the one or more applications to continue execution but not process requests. After executing one or more post-patching configuration steps, the update application may cause the one or more applications to begin processing requests.

Figure 6:
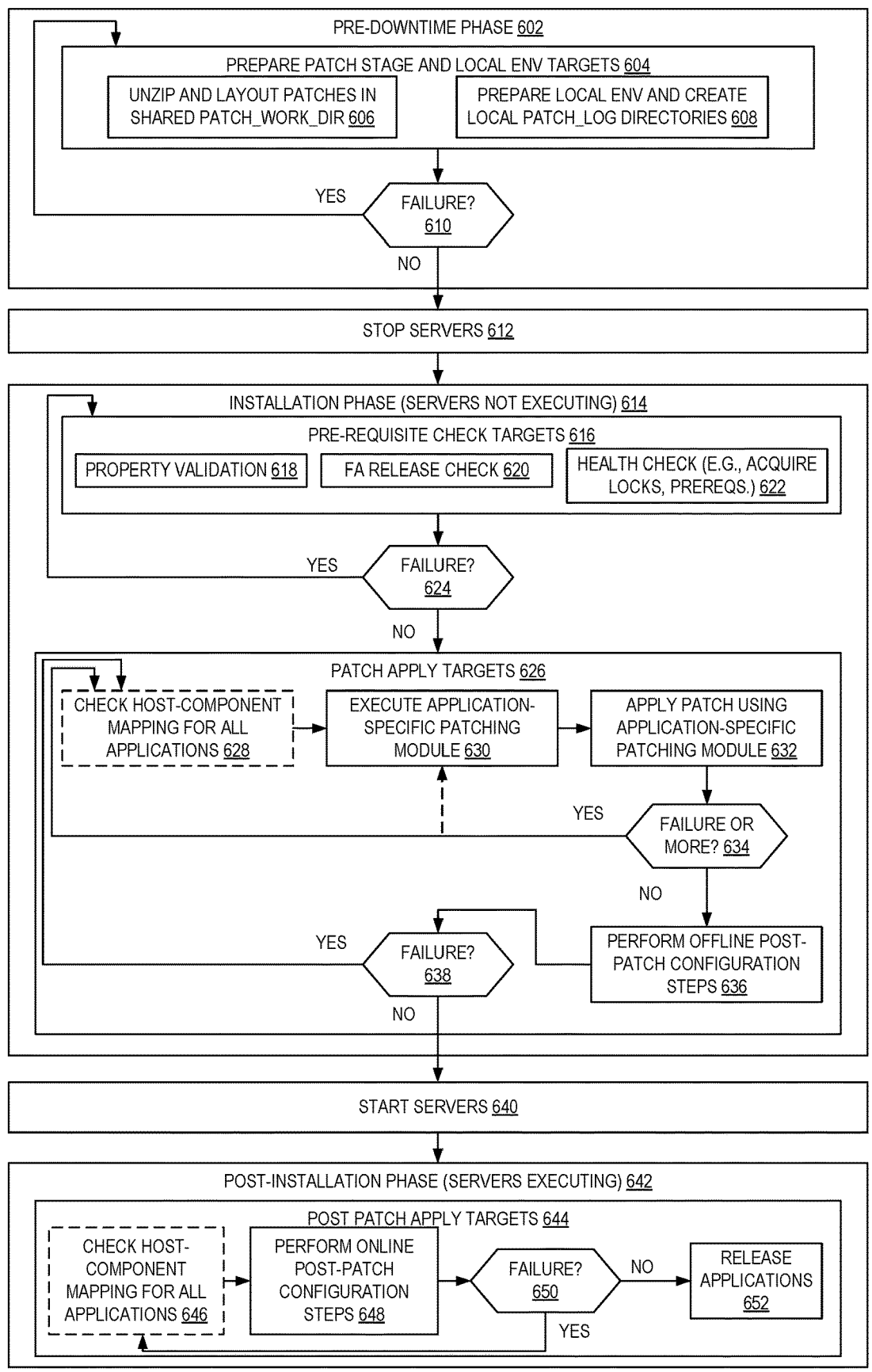
FIG. 6 illustrates a flow for efficient application patching in potentially heterogeneous computing environments in accordance with an embodiment of the present invention.

FIG. 6 illustrates a simplified process for efficient application patching in potentially heterogeneous computing environments in accordance with an embodiment of the present invention. This flow, in some embodiments, is performed by one computing device that is potentially in a set of multiple computing devices being patched. This flow includes three major phases of activity—a pre-downtime phase 602, an installation phase 614 (i.e., downtime activity where servers are not executing), and a post-installation phase 642 (i.e., post-downtime activity where the server applications are executing again). Of course, in other embodiments not all of these three phases are used, and in some embodiments there are additional phases or different ordering of the phases.

In this depicted flow, the process begins with a pre-downtime phase 602, which includes a preparation 604 of the patch stage and local environment targets. In some embodiments, this phase 602 begins at a request of an administrative server 302 (e.g., responsive to receipt of a command from the administrative server 302), but in some embodiments this phase 602 begins responsive to a local determination (i.e., within the computing device itself) to being the flow.

In some embodiments, the pre-downtime phase 602 includes unzipping 606 (i.e., unpacking) the received patches and laying out these unzipped files into a patch work directory. In some embodiments, this also includes preparing 608 the local environment (e.g., ensuring permissions, creating temporary files/directories, ensuring the availability of necessary resources) and creating a directory to store logs of the patching activity that will be generated. If any failures 610 occur in any of these steps, a set of troubleshooting steps may be performed and the process may continue with block 604, and in some embodiments the administrative server 302 (and/or administrator) is notified of the failure(s). Otherwise, at step 612, the servers (i.e., server applications) are halted 612.

Some embodiments permit a user of a computing device to designate or adjust when each of the three phases may begin or when one phase may transition into another. For example, a customer may select his or her downtime in which the servers will be halted so as to minimize any inconvenience (e.g., resource inaccessibility) to the customer.

With the servers halted, the installation phase 614 begins. In an embodiment, this includes a pre-requisite check 616, which may include a property validation phase 618 (e.g., verifying that the host-component mapping of the property file is accurate), a release check 620 (e.g., determine which releases exist of the applications), and/or a health check 622 (e.g., acquiring necessary resource locks, ensuring necessary usernames and passwords are valid) of the computing device and/or applications. If a failure 624 occurs, a set of troubleshooting steps may be performed and the process may continue with block 616, and in some embodiments the administrative server 302 (and/or administrator) is notified of the failure(s). Of particular note is that, in some embodiments, some or all aspects of the the pre-requisite check 616 (and possibly failure block 624) are performed within the pre-downtime phase 602. This, in some embodiments, serves as an optimization so that the time when the servers are stopped (e.g., from block 612 until block 640) is minimized, resulting in a reduced operational impact.

Otherwise, if no failures occur at block 624, the installation phase 614 continues with an application of targets 626. In some embodiments, this includes checking 628 the host-component mapping (e.g., property file) for all applications, executing an application-specific patching module 630, and applying 632 the patch(es) for the application using the executing application-specific patching module. If a failure 634 occurs, a set of troubleshooting steps may be performed and the process may continue with block 628, and in some embodiments the administrative server 302 (and/or administrator) is notified of the failure(s). If there are more applications to be patched 634, the process may continue with block 630 for the next application. If neither, the phase 614 may continue with block 636 where offline post-patch configuration steps are performed 636. If a failure 636 occurs, a set of troubleshooting steps may be performed and the process may continue with block 628, and in some embodiments the administrative server 302 (and/or administrator) is notified of the failure(s).

If no failures occur at block 638, in some embodiments the flow continues at block 640 with starting the affected servers, and then may continue with a post-installation phase 642 where the servers are executing. This phase 642, in embodiments, comprises a post-patch target application 644 that may include again checking the host-component mapping for the applications 646 and then performing any necessary online post-patch configuration steps 648. If a failure 650 occurs, a set of troubleshooting steps may be performed and the process may continue with block 646, and in some embodiments the administrative server 302 (and/or administrator) is notified of the failure(s). Otherwise, in some embodiments, the server applications are released 652 and thus may continue normal operation.

This decentralized manner in which the patching may occur across multiple computing systems potentially heterogenous computing environments increases efficiency. In one example, to apply 150-200 patches in each session may require a total of less than 3 hours, where the server shutdown and startup may account for less than 2 hours and the patching processing that includes the three phases: pre-downtime phase, an installation phase (i.e., downtime activity where servers are not executing), and a post-installation phase may account for less than 1 hour.

Figure 7:
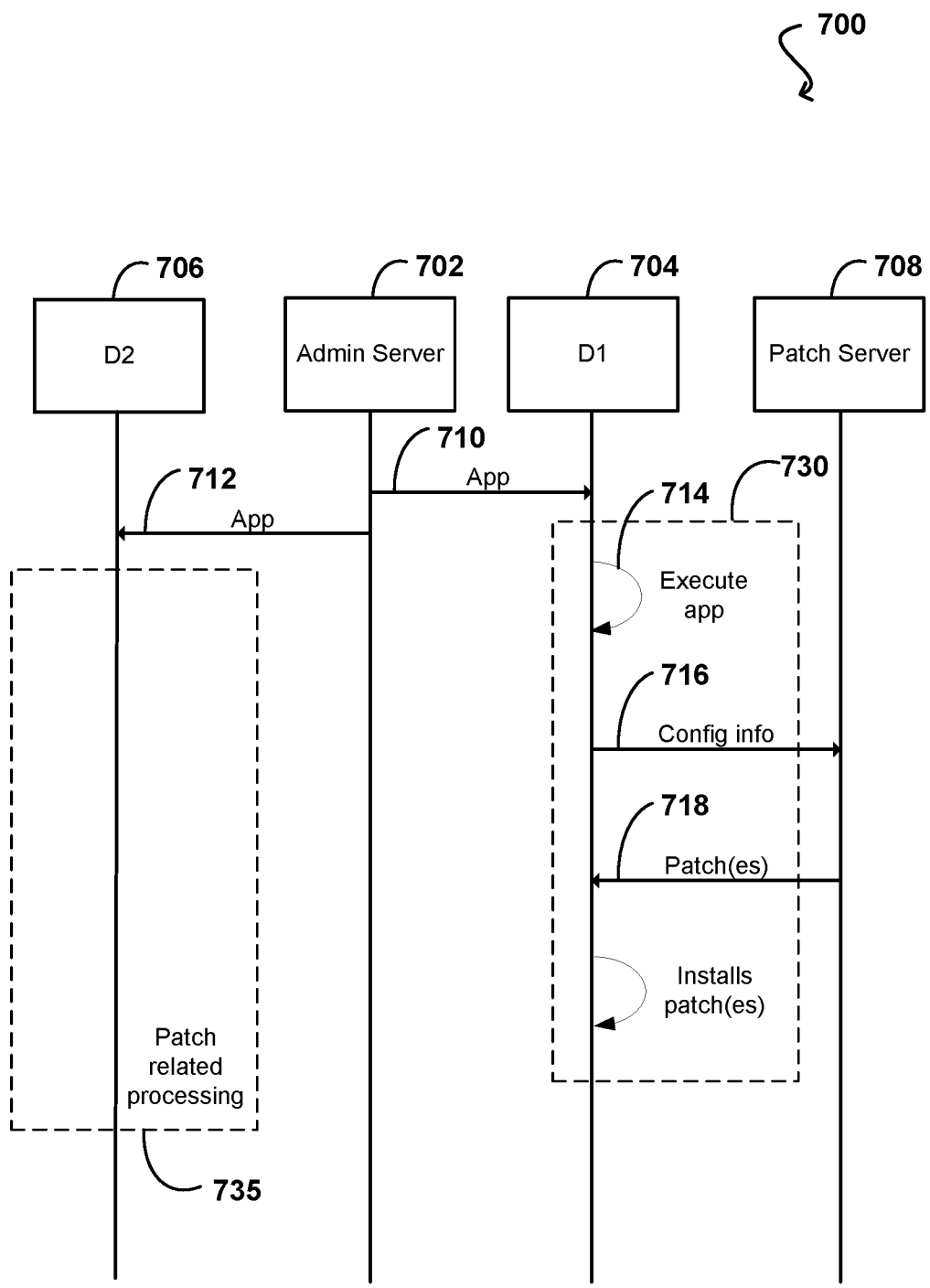
FIG. 7 illustrates an example time sequence for server application patching of software applications executing in multiple computing devices according to certain embodiments of the present invention.

FIG. 7 illustrates an example time sequence 700 for server application patching of software applications executing in multiple computing devices according to certain embodiments of the present invention. An administrative server can transmit a copy of an update application to one or more computing devices to be updated. As shown in time sequence 700 at 710, administrative server 702 sends a copy of an update application to a first device 704. Subsequently at 712, administrative server 702 sends another copy of the update application to a second device 706. Although this example shows the copies of the update application being sent to different devices sequentially, the administrative server can send the copies of the update application to multiple devices at the same time, e.g., upon receiving a request by an administrator.

After first device 704 receive a copy of the update application (and either before or after second device 706 receives a copy of the update application), patch-related processing 730 may begin. As shown in time sequence 700 at 714, first device 704 can execute the application. In some embodiments, the execution may be triggered by administrative server 702 issuing a command to computing device 704. In certain embodiments, the execution may be triggered by a schedule (e.g., designating one time or periodic updates). In some embodiments, the execution may be triggered by a user manually issuing a command.

As part of the execution, first device 704 may determine its configuration information and send the configuration information to patch server 708 at 716. The configuration information of a device can include a set of executing and relevant applications on the device. In certain embodiments, the update application may determine its configuration information by querying an operating system to search for particular application files, or searching through currently executing processes (e.g., issuing a "ps" Unix/Linux command to display executing processes), etc. In some embodiments, the configuration information may be stored in a property file received from administrative server 702. The property file may identify applications (and/or versions or releases of the applications) that are executing upon first device 704.

Upon receiving the configuration information, at 718, patch server 708 may determine a set of patches based on the configuration information received from first device 704 and send the set of patches to first device 704. At 720, first device 704 may the install the patches received.

After second device 706 receives the update application at 712, patch-related processing 735 may begin. As shown in time sequence 700, the duration of patch-related processing 735 may overlap at least partially with patch-related processing 730. In some embodiments, the duration of patch-related processing across different devices may be the same. In certain embodiments, the duration of patch-related processing may not overlap and may occur sequentially. Patch-related processing for each device may occur independently of one another.

In some embodiments, patch-related processing 735 may include a similar process as patch-related processing 730. For example, patch-related processing 735 for second device 706 may also include execution of the update application, interaction with patch server 708 to obtain the necessary patches for the update installation. Here, the patch-related processing 730 and 735 are performed independently by first device 704 and second device 706.

While patch-related processing 735 for second device 706 may occur in parallel and concurrently to patch-related processing 730 for first device 704, the total duration of the patch-related processing for the devices may not be the same. The duration of each portion of patch-related processing may also not be the same across different devices. For instance, the installation of the patches for first device 704 may require a longer duration of time compared to the installation of patches for second device 706. The timing at which each portion of patch-related processing begins can but need not be at the same time. For instance, the sending of configuration information to a patch server by the different devices may occur at the same time in parallel. In another instance, the execution of the app for the respective devices may occur at different times and may occur based on different triggers.

Figure 8:
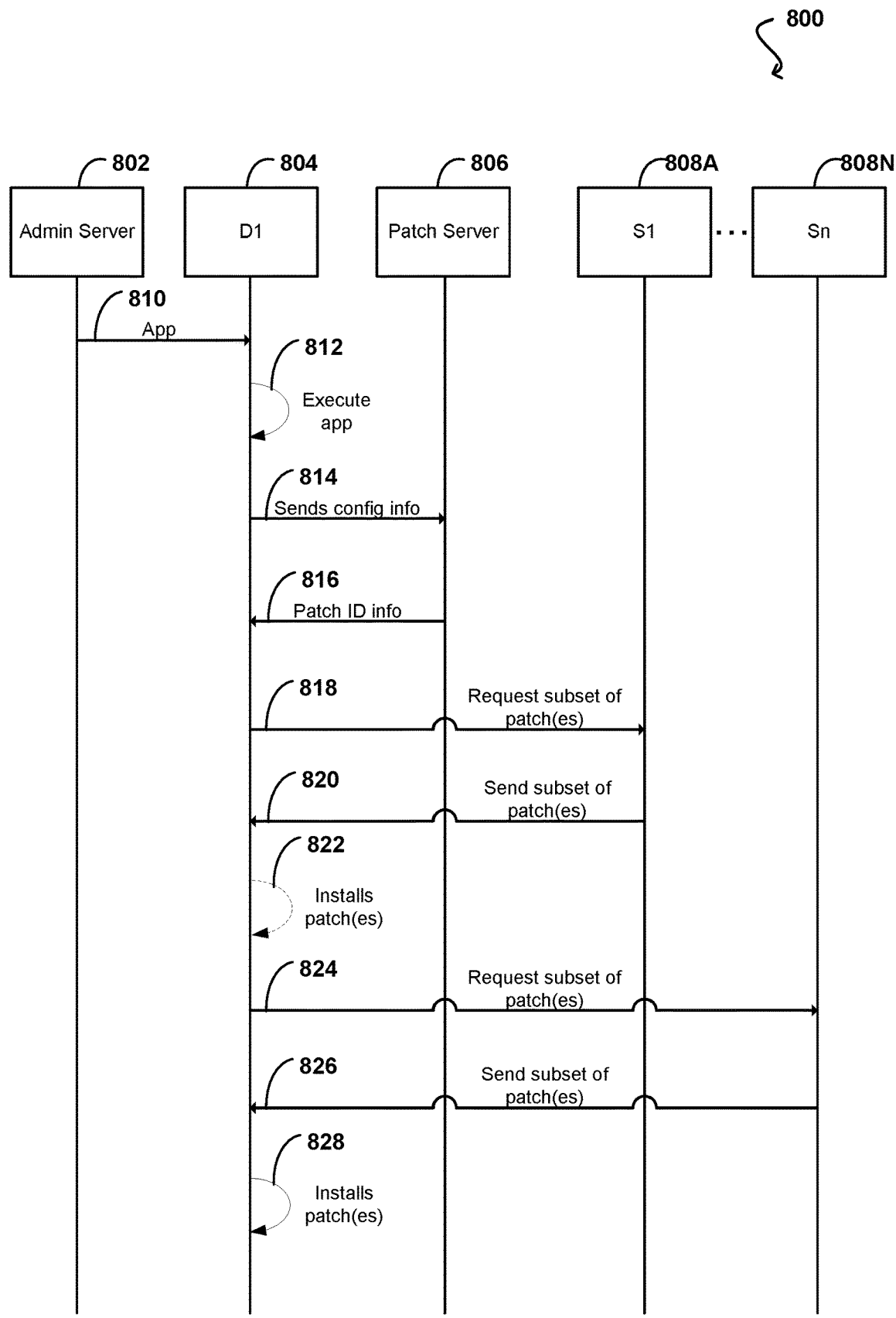
FIG. 8 illustrates an example time sequence for server application patching of software applications executing in a computing device according to certain embodiments of the present invention.

FIG. 8 illustrates an example time sequence 800 for server application patching of software applications executing in a computing device according to certain embodiments of the present invention. This time sequence is illustrated for one computing device that is potentially in a set of multiple computing devices being patched in the cloud infrastructure system. Although the application patching for only one computing device is shown in this example, multiple computing devices may perform their individual update processing in a similar manner independently from each other. The updating processing across the various devices may be performed in parallel where at least a portion of the processing is performed concurrently among the different devices.

As shown in this time sequence 800, an administrative server 802 can transmit a copy of an update application to computing device 804 to be updated at 810. At 812, computing device 804 can execute the application. In some embodiments, the execution may be triggered by administrative server 802 issuing a command to computing device 804. In certain embodiments, the execution may be triggered by a schedule or by a user manually issuing a command, etc.

As part of execution of the update application, computing device 804 may determine and send its configuration information to patch server 806 at 814. The configuration information of a device can include a set of executing and relevant applications on the device. In certain embodiments, the update application may determine its configuration information by querying an operating system to search for particular application files, or searching through currently executing processes (e.g., issuing a "ps" Unix/Linux command to display executing processes), etc. In some embodiments, the configuration information may be stored in a property file received from administrative server 802. The property file may identify applications (and/or versions or releases of the applications) that are executing upon computing device 804.

Upon receiving the configuration information, at 816, patch server 806 may determine patch identification information for a set of patches based on the configuration information received from first device 804 and send the patch identification information to computing device 804. The patch identification information may include information about the patches that are needed by computing device to perform the update. In some embodiments, the patch identification information may include patch identifiers that represent the patches to be retrieved and also location information indicating where each patch may be accessible and downloaded. In some embodiments, not all of the patches in the set of patches may be stored in the same location. Some embodiments may downloaded subsets of the patches less than the full set of patches from different locations (e.g., at one or more of servers 808A-808N).

At 818, computing device 804 may request a subset of patches from a first server 818A based on the location information that identifies where the subset of patches may be retrieved. At 820, first server 818A then sends the subset of patches back to computing device 804. Upon receiving the subset of patches, at 822, computing device 804 may install the patches received. In some embodiments, the computing device may not install the subset of patches received until all the required patches have been downloaded and received.

At 824, computing device 804 may request another subset of patches from another server 818N based on location information identifying where the other subset of patches may be retrieved. At 826, the other server 818N then sends the other subset of patches back to computing device 804. Upon receiving the subset of patches, at 828, computing device 804 may install the patches received. As described, in some embodiments, the computing device may wait until all the required patches have been downloaded from the various server systems and then start the installation process for the required patches (i.e., apply the patches).

While this example illustrates that a first subset of patches are downloaded from server 808A and installed at computing device 804 before a second subset of patches are downloaded from server 808N, some embodiments may download all the subsets of patches and then install the patches altogether at the same time. In certain embodiments, depending on the type of patches, the downloading and the installation of the patches can be performed in parallel. For example, while a subset of patches are being installed from one server system, another subset of patches may be downloaded as the subset of patches are being installed.

Figure 9:
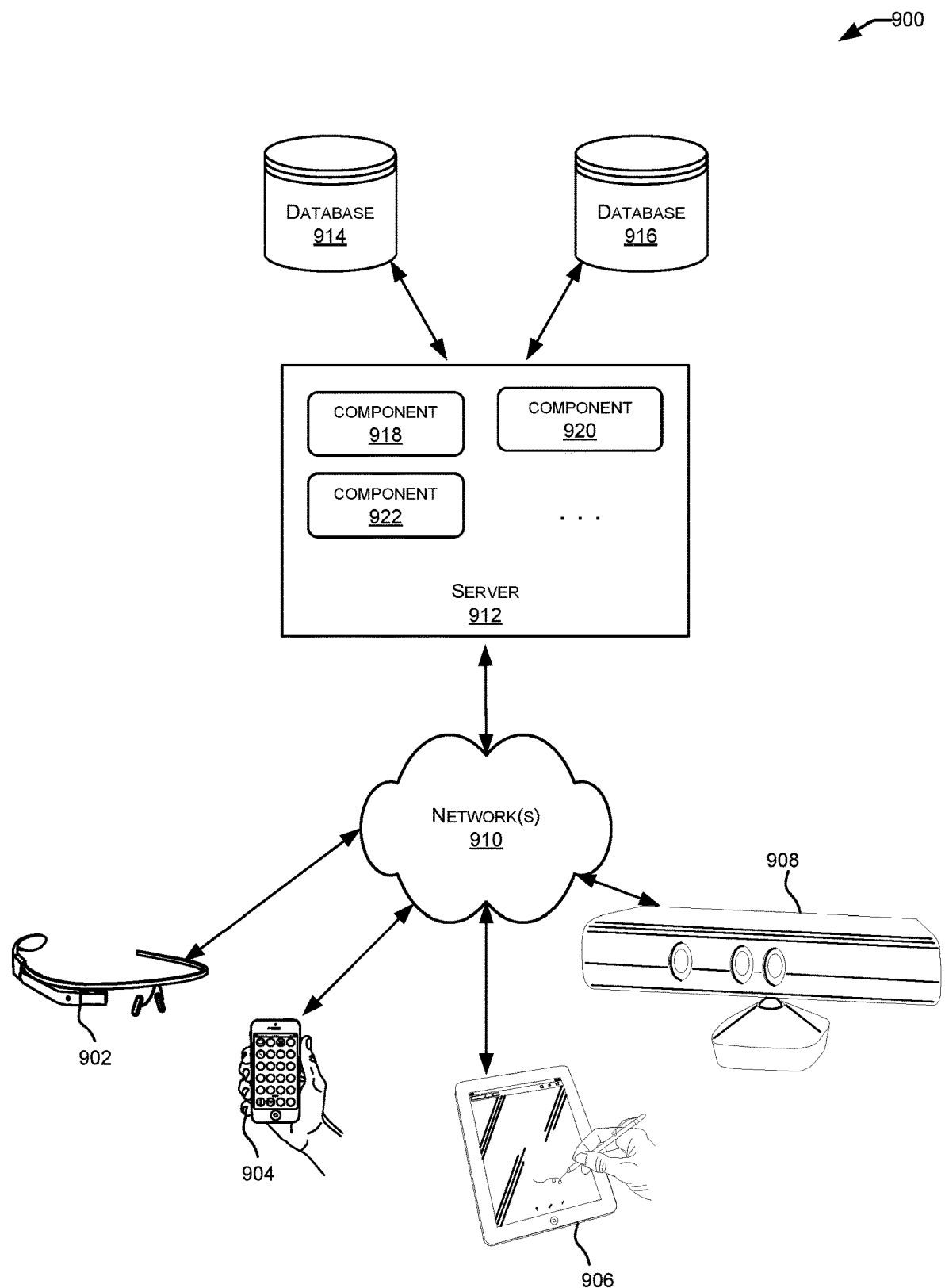
FIG. 9 depicts a simplified diagram of a distributed system for implementing one of the embodiments.

FIG. 9 depicts a simplified diagram of a distributed system 900 for implementing one of the embodiments. In the illustrated embodiment, distributed system 900 includes one or more client computing devices 902, 904, 906, and 908, which are configured to execute and operate a client application such as a web browser, proprietary client (e.g., Oracle Forms), or the like over one or more network(s) 910. Server 912 may be communicatively coupled with remote client computing devices 902, 904, 906, and 908 via network 910.

In various embodiments, server 912 may be adapted to run one or more services or software applications provided by one or more of the components of the system. In some embodiments, these services may be offered as web-based or cloud services or under a Software as a Service (SaaS) model to the users of client computing devices 902, 904, 906, and/or 908. Users operating client computing devices 902, 904, 906, and/or 908 may in turn utilize one or more client applications to interact with server 912 to utilize the services provided by these components.

In the configuration depicted in the figure, the software components 918, 920 and 922 of system 900 are shown as being implemented on server 912. In other embodiments, one or more of the components of system 900 and/or the services provided by these components may also be implemented by one or more of the client computing devices 902, 904, 906, and/or 908. Users operating the client computing devices may then utilize one or more client applications to use the services provided by these components. These components may be implemented in hardware, firmware, software, or combinations thereof. It should be appreciated that various different system configurations are possible, which may be different from distributed system 900. The embodiment shown in the figure is thus one example of a distributed system for implementing an embodiment system and is not intended to be limiting.

Client computing devices 902, 904, 906, and/or 908 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 902, 904, 906, and 908 may be any other electronic device, such as a thin-client computer, an Internet-enabled gaming system (e.g., a Microsoft Xbox gaming console with or without a Kinect® gesture input device), and/or a personal messaging device, capable of communicating over network(s) 910.

Although exemplary distributed system 900 is shown with four client computing devices, any number of client computing devices may be supported. Other devices, such as devices with sensors, etc., may interact with server 912.

Network(s) 910 in distributed system 900 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 910 can be a local area network (LAN), such as one based on Ethernet, Token-Ring and/or the like. Network(s) 910 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 912 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 912 may be adapted to run one or more services or software applications described in the foregoing disclosure. For example, server 912 may correspond to a server for performing processing described above according to an embodiment of the present disclosure.

Server 912 may run an operating system including any of those discussed above, as well as any commercially available server operating system. Server 912 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 912 may include one or more applications to analyze and consolidate data feeds and/or event updates received from users of client computing devices 902, 904, 906, and 908. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 912 may also include one or more applications to display the data feeds and/or real-time events via one or more display devices of client computing devices 902, 904, 906, and 908.

Distributed system 900 may also include one or more databases 914 and 916. Databases 914 and 916 may reside in a variety of locations. By way of example, one or more of databases 914 and 916 may reside on a non-transitory storage medium local to (and/or resident in) server 912. Alternatively, databases 914 and 916 may be remote from server 912 and in communication with server 912 via a network-based or dedicated connection. In one set of embodiments, databases 914 and 916 may reside in a storage-area network (SAN). Similarly, any necessary files for performing the functions attributed to server 912 may be stored locally on server 912 and/or remotely, as appropriate. In one set of embodiments, databases 914 and 916 may include relational databases, such as databases provided by Oracle, that are adapted to store, update, and retrieve data in response to SQL-formatted commands.

Figure 10:
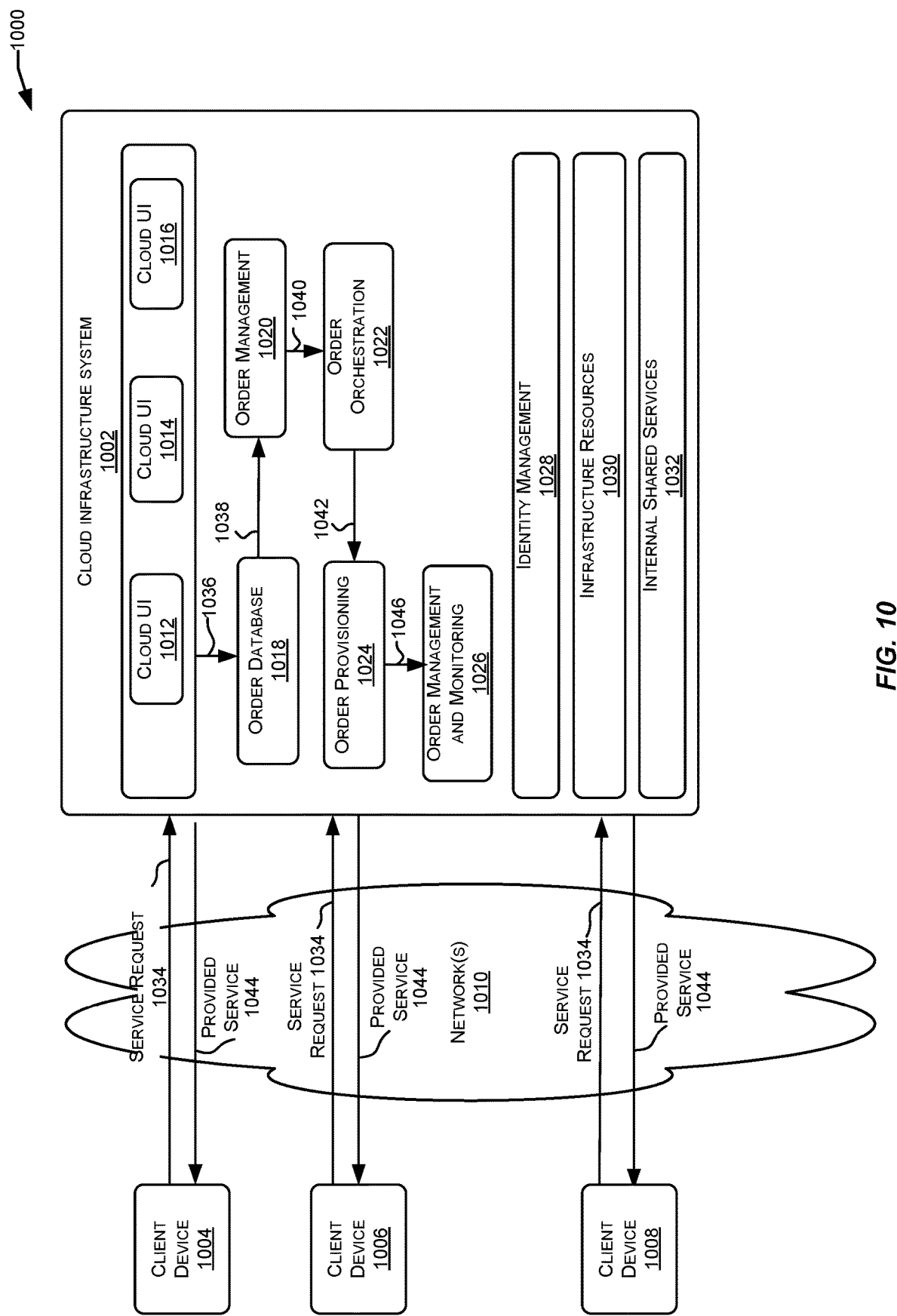
FIG. 10 is a simplified block diagram of components of a system environment by which services provided by the components of an embodiment system may be offered as cloud services, in accordance with an embodiment of the present disclosure.

FIG. 10 is a simplified block diagram of one or more components of a system environment 1000 by which services provided by one or more components of an embodiment system may be offered as cloud services, in accordance with an embodiment of the present disclosure. In the illustrated embodiment, system environment 1000 includes one or more client computing devices 1004, 1006, and 1008 that may be used by users to interact with a cloud infrastructure system 1002 that provides cloud services. The client computing devices may be configured to operate a client application such as a web browser, a proprietary client application (e.g., Oracle Forms), or some other application, which may be used by a user of the client computing device to interact with cloud infrastructure system 1002 to use services provided by cloud infrastructure system 1002.

It should be appreciated that cloud infrastructure system 1002 depicted in the figure may have other components than those depicted. Further, the embodiment shown in the figure is only one example of a cloud infrastructure system that may incorporate an embodiment of the invention. In some other embodiments, cloud infrastructure system 1002 may have more or fewer components than shown in the figure, may combine two or more components, or may have a different configuration or arrangement of components.

Client computing devices 1004, 1006, and 1008 may be devices similar to those described above for 902, 904, 906, and 908.

Although exemplary system environment 1000 is shown with three client computing devices, any number of client computing devices may be supported. Other devices such as devices with sensors, etc. may interact with cloud infrastructure system 1002.

Network(s) 1010 may facilitate communications and exchange of data between clients 1004, 1006, and 1008 and cloud infrastructure system 1002. Each network may be any type of network familiar to those skilled in the art that can support data communications using any of a variety of commercially-available protocols, including those described above for network(s) 910.

Cloud infrastructure system 1002 may comprise one or more computers and/or servers that may include those described above for server 912.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1002 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 1002 may be adapted to automatically provision, manage and track a customer's subscription to services offered by cloud infrastructure system 1002. Cloud infrastructure system 1002 may provide the cloud services via different deployment models. For example, services may be provided under a public cloud model in which cloud infrastructure system 1002 is owned by an organization selling cloud services (e.g., owned by Oracle) and the services are made available to the general public or different industry enterprises. As another example, services may be provided under a private cloud model in which cloud infrastructure system 1002 is operated solely for a single organization and may provide services for one or more entities within the organization. The cloud services may also be provided under a community cloud model in which cloud infrastructure system 1002 and the services provided by cloud infrastructure system 1002 are shared by several organizations in a related community. The cloud services may also be provided under a hybrid cloud model, which is a combination of two or more different models.

In some embodiments, the services provided by cloud infrastructure system 1002 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1002. Cloud infrastructure system 1002 then performs processing to provide the services in the customer's subscription order.

In some embodiments, the services provided by cloud infrastructure system 1002 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1002 may also include infrastructure resources 1030 for providing the resources used to provide various services to customers of the cloud infrastructure system. In one embodiment, infrastructure resources 1030 may include pre-integrated and optimized combinations of hardware, such as servers, storage, and networking resources to execute the services provided by the PaaS platform and the SaaS platform.

In some embodiments, resources in cloud infrastructure system 1002 may be shared by multiple users and dynamically re-allocated per demand. Additionally, resources may be allocated to users in different time zones. For example, cloud infrastructure system 1002 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 932 may be provided that are shared by different components or modules of cloud infrastructure system 1002 and by the services provided by cloud infrastructure system 1002. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1002 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1002, and the like.

In one embodiment, as depicted in the figure, cloud management functionality may be provided by one or more modules, such as an order management module 1020, an order orchestration module 1022, an order provisioning module 1024, an order management and monitoring module 1026, and an identity management module 1028. These modules may include or be provided using one or more computers and/or servers, which may be general purpose computers, specialized server computers, server farms, server clusters, or any other appropriate arrangement and/or combination.

In exemplary operation 1034, a customer using a client device, such as client device 1004, 1006 or 1008, may interact with cloud infrastructure system 1002 by requesting one or more services provided by cloud infrastructure system 1002 and placing an order for a subscription for one or more services offered by cloud infrastructure system 1002. In certain embodiments, the customer may access a cloud User Interface (UI), cloud UI 1012, cloud UI 1014 and/or cloud UI 1016 and place a subscription order via these UIs. The order information received by cloud infrastructure system 1002 in response to the customer placing an order may include information identifying the customer and one or more services offered by the cloud infrastructure system 1002 that the customer intends to subscribe to.

After an order has been placed by the customer, the order information is received via the cloud UIs, 1012, 1014 and/or 1016.

At operation 1036, the order is stored in order database 1018. Order database 1018 can be one of several databases operated by cloud infrastructure system 918 and operated in conjunction with other system elements.

At operation 1038, the order information is forwarded to an order management module 1020. In some instances, order management module 1020 may be configured to perform billing and accounting functions related to the order, such as verifying the order, and upon verification, booking the order.

At operation 1040, information regarding the order is communicated to an order orchestration module 1022. Order orchestration module 1022 may utilize the order information to orchestrate the provisioning of services and resources for the order placed by the customer. In some instances, order orchestration module 1022 may orchestrate the provisioning of resources to support the subscribed services using the services of order provisioning module 1024.

In certain embodiments, order orchestration module 1022 enables the management of business processes associated with each order and applies business logic to determine whether an order should proceed to provisioning. At operation 1042, upon receiving an order for a new subscription, order orchestration module 1022 sends a request to order provisioning module 1024 to allocate resources and configure those resources needed to fulfill the subscription order. Order provisioning module 1024 enables the allocation of resources for the services ordered by the customer. Order provisioning module 1024 provides a level of abstraction between the cloud services provided by cloud infrastructure system 1002 and the physical implementation layer that is used to provision the resources for providing the requested services. Order orchestration module 1022 may thus be isolated from implementation details, such as whether or not services and resources are actually provisioned on the fly or pre-provisioned and only allocated/assigned upon request.

At operation 1044, once the services and resources are provisioned, a notification of the provided service may be sent to customers on client devices 1004, 1006 and/or 1008 by order provisioning module 1024 of cloud infrastructure system 1002.

At operation 1046, the customer's subscription order may be managed and tracked by an order management and monitoring module 1026. In some instances, order management and monitoring module 1026 may be configured to collect usage statistics for the services in the subscription order, such as the amount of storage used, the amount data transferred, the number of users, and the amount of system up time and system down time.

In certain embodiments, cloud infrastructure system 1002 may include an identity management module 1028. Identity management module 1028 may be configured to provide identity services, such as access management and authorization services in cloud infrastructure system 1002. In some embodiments, identity management module 1028 may control information about customers who wish to utilize the services provided by cloud infrastructure system 1002. Such information can include information that authenticates the identities of such customers and information that describes which actions those customers are authorized to perform relative to various system resources (e.g., files, directories, applications, communication ports, memory segments, etc.) Identity management module 1028 may also include the management of descriptive information about each customer and about how and by whom that descriptive information can be accessed and modified.

Figure 11:
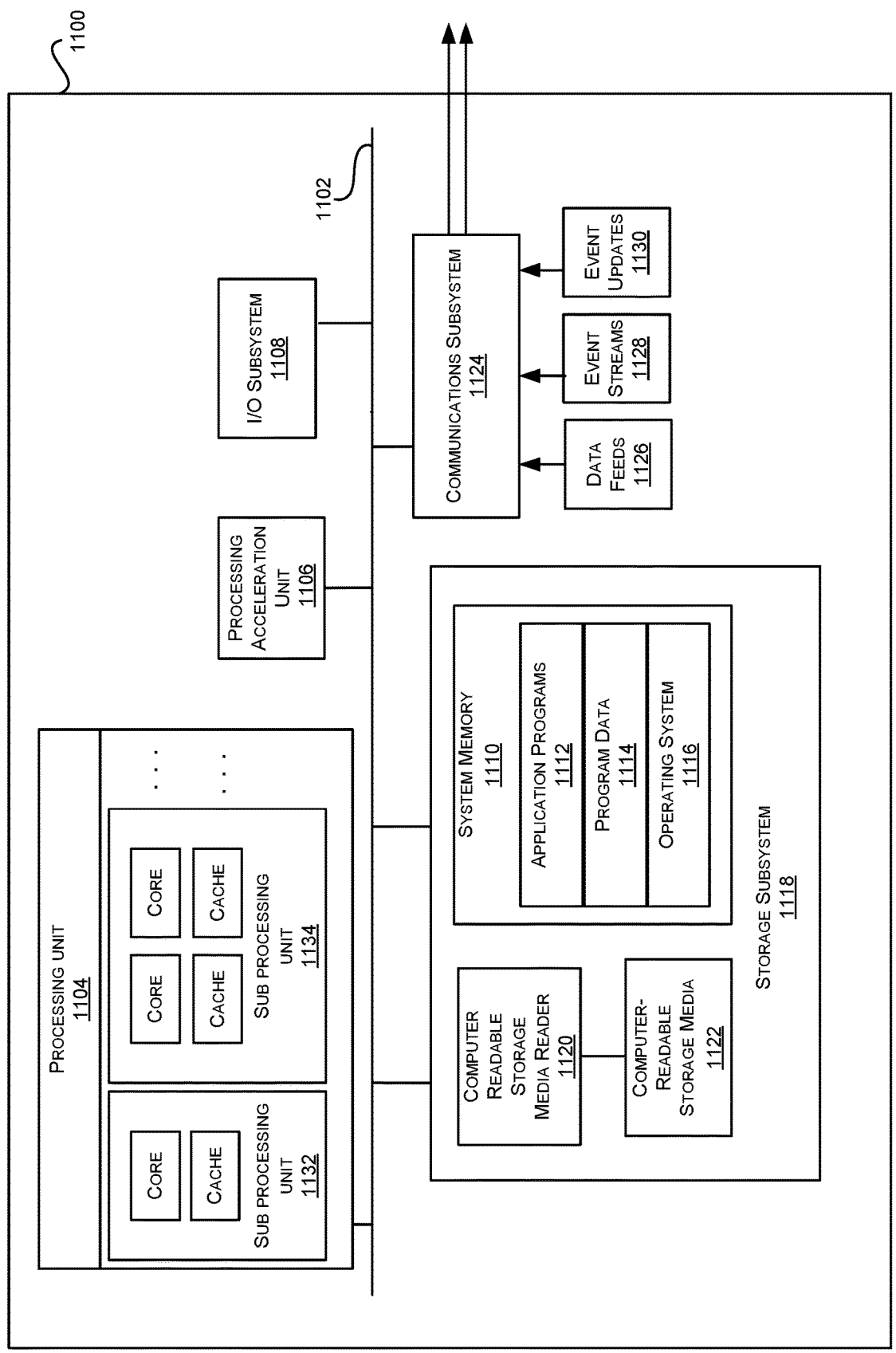
FIG. 11 illustrates an exemplary computer system, in which various embodiments of the present invention may be implemented.

FIG. 11 illustrates an exemplary computer system 1100, in which various embodiments of the present invention may be implemented. The system 1100 may be used to implement any of the computer systems described above. As shown in the figure, computer system 1100 includes a processing unit 1104 that communicates with a number of peripheral subsystems via a bus subsystem 1102. These peripheral subsystems may include a processing acceleration unit 1106, an I/O subsystem 1108, a storage subsystem 1118 and a communications subsystem 1124. Storage subsystem 1118 includes tangible computer-readable storage media 1122 and a system memory 1110.

Bus subsystem 1102 provides a mechanism for letting the various components and subsystems of computer system 1100 communicate with each other as intended. Although bus subsystem 1102 is shown schematically as a single bus, alternative embodiments of the bus subsystem may utilize multiple buses. Bus subsystem 1102 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1104, which can be implemented as one or more integrated circuits (e.g., a conventional microprocessor or microcontroller), controls the operation of computer system 1100. One or more processors may be included in processing unit 1104. These processors may include single core or multicore processors. In certain embodiments, processing unit 1104 may be implemented as one or more independent processing units 1132 and/or 1134 with single or multicore processors included in each processing unit. In other embodiments, processing unit 1104 may also be implemented as a quad-core processing unit formed by integrating two dual-core processors into a single chip.

In various embodiments, processing unit 1104 can execute a variety of programs in response to program code and can maintain multiple concurrently executing programs or processes. At any given time, some or all of the program code to be executed can be resident in processor(s) 1104 and/or in storage subsystem 1118. Through suitable programming, processor(s) 1104 can provide various functionalities described above. Computer system 1100 may additionally include a processing acceleration unit 1106, which can include a digital signal processor (DSP), a special-purpose processor, and/or the like.

I/O subsystem 1108 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1100 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1100 may comprise a storage subsystem 1118 that comprises software elements, shown as being currently located within a system memory 1110. System memory 1110 may store program instructions that are loadable and executable on processing unit 1104, as well as data generated during the execution of these programs.

Depending on the configuration and type of computer system 1100, system memory 1110 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1104. In some implementations, system memory 1110 may include multiple different types of memory, such as static random access memory (SRAM) or dynamic random access memory (DRAM). In some implementations, a basic input/output system (BIOS), containing the basic routines that help to transfer information between elements within computer system 1100, such as during start-up, may typically be stored in the ROM. By way of example, and not limitation, system memory 1110 also illustrates application programs 1112, which may include client applications, Web browsers, mid-tier applications, relational database management systems (RDBMS), etc., program data 1114, and an operating system 1116. By way of example, operating system 1116 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1118 may also provide a tangible computer-readable storage medium for storing the basic programming and data constructs that provide the functionality of some embodiments. Software (programs, code modules, instructions) that when executed by a processor provide the functionality described above may be stored in storage subsystem 1118. These software modules or instructions may be executed by processing unit 1104. Storage subsystem 1118 may also provide a repository for storing data used in accordance with the present invention.

Storage subsystem 1100 may also include a computer-readable storage media reader 1120 that can further be connected to computer-readable storage media 1122. Together and, optionally, in combination with system memory 1110, computer-readable storage media 1122 may comprehensively represent remote, local, fixed, and/or removable storage devices plus storage media for temporarily and/or more permanently containing, storing, transmitting, and retrieving computer-readable information.

Computer-readable storage media 1122 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1100.

By way of example, computer-readable storage media 1122 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1122 may include, but is not limited to, Zip® drives, flash memory cards, universal serial bus (USB) flash drives, secure digital (SD) cards, DVD disks, digital video tape, and the like. Computer-readable storage media 1122 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1100.

Communications subsystem 1124 provides an interface to other computer systems and networks. Communications subsystem 1124 serves as an interface for receiving data from and transmitting data to other systems from computer system 1100. For example, communications subsystem 1124 may enable computer system 1100 to connect to one or more devices via the Internet. In some embodiments communications subsystem 1124 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1124 can provide wired network connectivity (e.g., Ethernet) in addition to or instead of a wireless interface.

In some embodiments, communications subsystem 1124 may also receive input communication in the form of structured and/or unstructured data feeds 1126, event streams 1128, event updates 1130, and the like on behalf of one or more users who may use computer system 1100.

By way of example, communications subsystem 1124 may be configured to receive data feeds 1126 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1124 may also be configured to receive data in the form of continuous data streams, which may include event streams 1128 of real-time events and/or event updates 1130, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1124 may also be configured to output the structured and/or unstructured data feeds 1126, event streams 1128, event updates 1130, and the like to one or more databases that may be in communication with one or more streaming data source computers coupled to computer system 1100.

Computer system 1100 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1100 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A server configured to:
   transmit an update application to a plurality of computing devices to enable each computing device of the plurality of computing devices to execute the update application, the executing of the update application causes the computing device to perform, without communicating with the server:
   determining configuration information associated with the computing device;
   determining, based on the configuration information, one or more labels;
   transmitting the one or more labels to a patch server;
   downloading one or more patches from one or more servers based on information received from the patch server after the one or more labels are transmitted to the patch server; and
   updating the computing device based on the one or more patches.

2. The server of claim 1, wherein the plurality of computing devices execute the update application in parallel.

3. The server of claim 1, wherein at least some of the computing devices of the plurality of computing devices execute the update application at different times based on at least one of: a pre-set schedule, or a command received from users of the at least some of the computing devices.

4. The server of claim 1, further configured to transmit a command to each computing device of the plurality of computing devices to trigger the execution of the update application at the computing device.

5. The server of claim 1, wherein the configuration information identifies:
   a first application installed at a first computing device of the plurality of computing devices; and
   a second application installed at a second computing device of the plurality of computing devices.

6. The server of claim 5, further configured to:
   transmit, as part of the update application to the first computing device, first mapping information that identifies the first application installed at the first computing device; and
   transmit, as part of the update application to the second computing device, second mapping information that identifies the second application installed at the second computing device.

7. The server of claim 6, wherein the update application transmitted to each of the first computing device and the second computing device includes both the first mapping information and the second mapping information.

8. The server of claim 1, wherein determining configuration information comprises performing a scan of an operating system at the computing device.

9. A method comprising:
   transmitting, by a server, an update application to a plurality of computing devices to enable each computing device of the plurality of computing devices to execute the update application, the executing of the update application causes the computing device to perform, without communicating with the server:
   determining configuration information associated with the computing device;
   determining, based on the configuration information, one or more labels;
   transmitting the one or more labels to a patch server;
   downloading one or more patches from one or more servers based on information received from the patch server after the one or more labels are transmitted; and
   updating the computing device based on the one or more patches.

10. The method of claim 9, wherein the plurality of computing devices execute the update application in parallel.

11. The method of claim 9, wherein at least some of the computing devices of the plurality of computing devices execute the update application at different times based on at least one of: a pre-set schedule, or a command received from users of the at least some of the computing devices.

12. A non-transitory computer readable storage medium of a computing device storing instructions of an update application received from a server, wherein the instructions, when executed by one or more processors of the computing device, cause the computing device to perform, without communicating with the server:
   determining configuration information associated with the computing device;
   determining, based on the configuration information, one or more labels;
   transmitting the one or more labels to a patch server;
   downloading one or more patches from one or more servers based on information received from the patch server after the one or more labels are transmitted; and
   updating the computing device based on the one or more patches.

13. The non-transitory computer readable storage medium of claim 12, wherein the update application includes first mapping information that identifies a first application installed at the computing device and second mapping information that identifies a second application installed at a second computing device.

14. The non-transitory computer readable storage medium of claim 12, wherein the instructions, when executed by one or more processors of the computing device, cause the computing device to perform, without communicating with the server, a scan of an operating system at the computing device.

15. The method of claim 9, wherein the configuration information identifies:
   a first application installed at a first computing device of the plurality of computing devices; and
   a second application installed at a second computing device of the plurality of computing devices.

16. The method of claim 15, further comprising:
   transmitting, as part of the update application to the first computing device, first mapping information that identifies the first application installed at the first computing device; and
   transmitting, as part of the update application to the second computing device, second mapping information that identifies the second application installed at the second computing device,
   wherein the update application transmitted to each of the first computing device and the second computing device includes both the first mapping information and the second mapping information.

17. The method of claim 9, wherein determining configuration information comprises performing a scan of an operating system at the computing device.

18. The non-transitory computer readable storage medium of claim 12, wherein the configuration information identifies:
   a first application installed at a first computing device of a plurality of computing devices; and
   a second application installed at a second computing device of a plurality of computing devices.

19. The non-transitory computer readable storage medium of claim 18, wherein the update application includes both first mapping information that identifies the first application installed at the first computing device and second mapping information that identifies the second application installed at the second computing device.

20. The non-transitory computer readable storage medium of claim 12, wherein determining configuration information comprises performing a scan of an operating system at the computing device.

* * * * *